(12) United States Patent
Roy

(10) Patent No.: US 8,848,691 B2
(45) Date of Patent: *Sep. 30, 2014

(54) COMMON MOBILITY MANAGEMENT PROTOCOL FOR MULTIMEDIA APPLICATIONS, SYSTEMS AND SERVICES

(75) Inventor: Radhika R. Roy, Scotch Plains, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 840 days.

This patent is subject to a terminal disclaimer.

(21) Appl. No.: 12/474,603

(22) Filed: May 29, 2009

(65) Prior Publication Data

US 2009/0232132 A1    Sep. 17, 2009

Related U.S. Application Data

(63) Continuation of application No. 11/169,538, filed on Jun. 29, 2005, now Pat. No. 7,551,608, which is a continuation of application No. 09/996,577, filed on Nov. 30, 2001, now Pat. No. 6,934,534.

(60) Provisional application No. 60/286,305, filed on Apr. 25, 2001.

(51) Int. Cl.
*H04L 12/66* (2006.01)

(52) U.S. Cl.
USPC ........ 370/352; 370/310.2; 370/328; 455/406; 455/409; 455/410; 455/411; 455/414.1; 455/418; 455/419; 455/420; 455/435.1; 379/91.01; 379/114.14

(58) Field of Classification Search
CPC ..... H04W 12/12; H04W 12/06; H04W 60/00; H04W 80/04; H04M 2215/32; H04M 15/00; H04L 2012/5617; G07F 7/08

USPC ...... 455/406, 409, 410, 411, 414.1, 455/418–420, 435.1; 370/310.2, 328; 379/114.14, 91.01

See application file for complete search history.

(56) References Cited

U.S. PATENT DOCUMENTS

| | | | |
|---|---|---|---|
| 5,862,481 | A | 1/1999 | Kulkarni et al. |
| 6,400,816 | B1 | 6/2002 | Hjalmtysson et al. |
| 6,587,476 | B1 | 7/2003 | Lewin et al. |
| 6,690,654 | B2 | 2/2004 | Elliott et al. |
| 6,714,987 | B1 | 3/2004 | Amin et al. |
| 6,728,536 | B1 | 4/2004 | Basilier et al. |
| 2001/0003191 | A1 | 6/2001 | Kovacs et al. |

*Primary Examiner* — Steve D Agosta

(57) ABSTRACT

A framework of a common mobility management protocol for Q.5/16 includes a high level protocol for performing the functions of address resolution, routing, location update and authentication. The common mobility management protocol can be used by existing and future multimedia applications (MA's) to support mobility management for messaging among mobility management authentication function (AuF), home location function (HLF) and visitor location function (VLF) databases/servers, and the corresponding multimedia application functional entities (MAFEs) of the multimedia applications (MA's). The common mobility management protocol may replace, act in concert with or in sequence with existent interworking protocols for the various multimedia applications. Reference point architectures, functional characteristics, features, and capabilities of the protocol are described including call flows and message syntax. The disclosure presents the scope of Q.5/16 and how H.MMS.1 (H.323 Mobility), H.MMS.2 (Global Mobility), and H.MMS.3 (Presence/Instant Messaging Mobility) can be a part of the same common mobility management protocol.

18 Claims, 10 Drawing Sheets

COMMON MOBILITY MANAGEMENT PROTOCOL FOR MULTIMEDIA APPLICATIONS, SYSTEMS AND SERVICES

This application is a continuation of U.S. application Ser. No. 11/169,538 filed on Jun. 29, 2005, which is a continuation of U.S. application Ser. No. 09/996,577 filed on Nov. 30, 2001, which claims priority to U.S. Provisional Application No. 60/286,305, filed on Apr. 25, 2001 and is related by subject matter to concurrently filed U.S. patent application Ser. No. 09/996,568 filed on Nov. 2, 2001, both by the same inventor. The contents of each of these applications are incorporated herein by reference.

TECHNICAL FIELD

This invention relates to the telecommunications field including both circuit-switched and packet-switched architectures in which mobile terminals are capable of supporting plural different multimedia applications including instant messaging, H.323 mobility and global mobility applications among others and provides a common protocol for such multimedia applications, systems and services to support terminal mobility.

BACKGROUND OF INVENTION

Today's telecommunications consumer has a variety of wireless and/or wired communications devices to choose from and multimedia applications for these devices. Some of the devices include and are not limited to the following list: notebook, laptop and larger personal computers, palm-size personal computers, wireless paging devices, pocket messaging devices, cellular telephones, World Wide Web access devices as small as palm-size to laptop-size devices and cordless telephones. One or more multimedia applications can run on these devices and most, if not all of these devices may be portable or mobile. That is, the user can change location and connect in a new location either via wired line or coaxial cable at a telecommunications or coaxial cable jack (optical fiber soon to come) of wireless local area networks or wire-line networks with number portability like 800-number freephone or wireless connection to ground-based antenna or to orbiting satellites over channels from the lower to higher (lightwave/free-space optical) frequencies of the radio frequency spectrum. Yet, despite the differences in media used to communicate and between multimedia applications, each device commonly communicates at least where it is, its identity (and, often, who is using it) and what it wants to do to some receiving functional entity in each of these applications and supporting protocols. The multimedia architectures on which these applications run include and are not limited to wireless LAN, wireless WAN, instant messaging networks, IP web searching networks and related services, IP telephony and switched telephony (voice and video) networks, both fixed and wireless among others. Today's consumer may take their wireless cell phone to Europe or Japan from the United States and expect full connectivity for multimedia applications, fly on a plane and expect to download a movie for watching on their personal computer, take an Internet voice/video or conventional switched circuit telephone call wherever they are, search the World Wide Web and transmit and receive instantaneous messages and associated documents or data as they walk, fly on a plane, travel in an automobile or on a boat or ride on a train.

Each of the applications that play on these mobile devices have developed differently with a different messaging protocol and different addressing schemes. It is well recognized, for example, that a mobile user of such devices, today, may have as many addresses and passwords as to be almost boundless, only limited by the imagination: one's telephone number, office telephone number, office e-mail address, home e-mail address, cell phone telephone number, pager number and so on with each connection often requiring their own personal identification number or other security access code. Some of the protocols developed on an international basis include, but are not limited to H.324 POTS video-conferencing, H.323 mobility protocol, H.320 ISDN video-conferencing and S.I.P. (Session Initiated Protocol), Presence/Instant Messaging (PIM) protocol, IMT 2000 among others too numerous to mention.

In my prior U.S. patent application Ser. Nos. 09/642,142; 09/642,279, 09/642,298 filed Aug. 18, 2000 and Ser. No. 09/825,304 filed Apr. 4, 2001, a real-time mobility protocol, architecture and intelligent signaling scheme are introduced for real-time applications as well as functional elements introduced for interworking among protocols, all of which should be deemed to be incorporated by reference as to their entire subject matter.

Nevertheless, there are many mobile multimedia applications, as listed above, which may run independently and, permitted to develop unchecked, will cause to be built an immense infrastructure over time that can jeopardize the efficiency and speed of operation of the applications themselves. Many of the devices mentioned above are being developed to perform multiple applications and support multiple, different protocols. The manufacturers of such devices and supporting network equipment have competing interests with the managers of global networks in supporting terminal/device mobility, the former being desirous of building equipment and software for the complex architecture and the network being desirous of providing efficient speedy communications services in all mobile applications. Consequently, there is a need for a common mobility management protocol and functionality to handle the several existent, different multimedia applications.

SUMMARY OF THE INVENTION

In my co-pending, concurrently filed U.S. patent application Ser. No. 09/996,568 filed on Nov. 2, 2001, entitled "Framework for Extensions of Multimedia Applications, Systems and Services to Support Terminal Mobility," incorporated herein by reference as to its entire contents, there is described a framework for a common mobility management protocol. It is demonstrated that each mobility application may have its own protocol and what will be referred to in the present application as multimedia application functional entities (MAFE) which may or may not be extended for terminal mobility among applications. The problems of extending such applications for mobility management are overcome by the principles of the present disclosure, a common mobility management protocol for present and future multimedia applications. A common mobility management protocol for different multimedia applications including but not limited to such multimedia applications as H.323, Presence/Instant messaging and global mobility applications comprises an address template for defining a set of address identifiers and profile information for completing an attempted communication to an identified address and descriptors for carrying the address information. MAFE's exchange messages with mobility management functional entities (MMFE's), for example, a home location function (HLF), a visitor location function (VLF) and an authentication function (AuF), and these MMFE's exchange messages between and among themselves using the common mobility management protocol of the present disclosure in any of a centralized or distributed architecture.

DETAILED DESCRIPTION OF THE INVENTION

Figure 1:
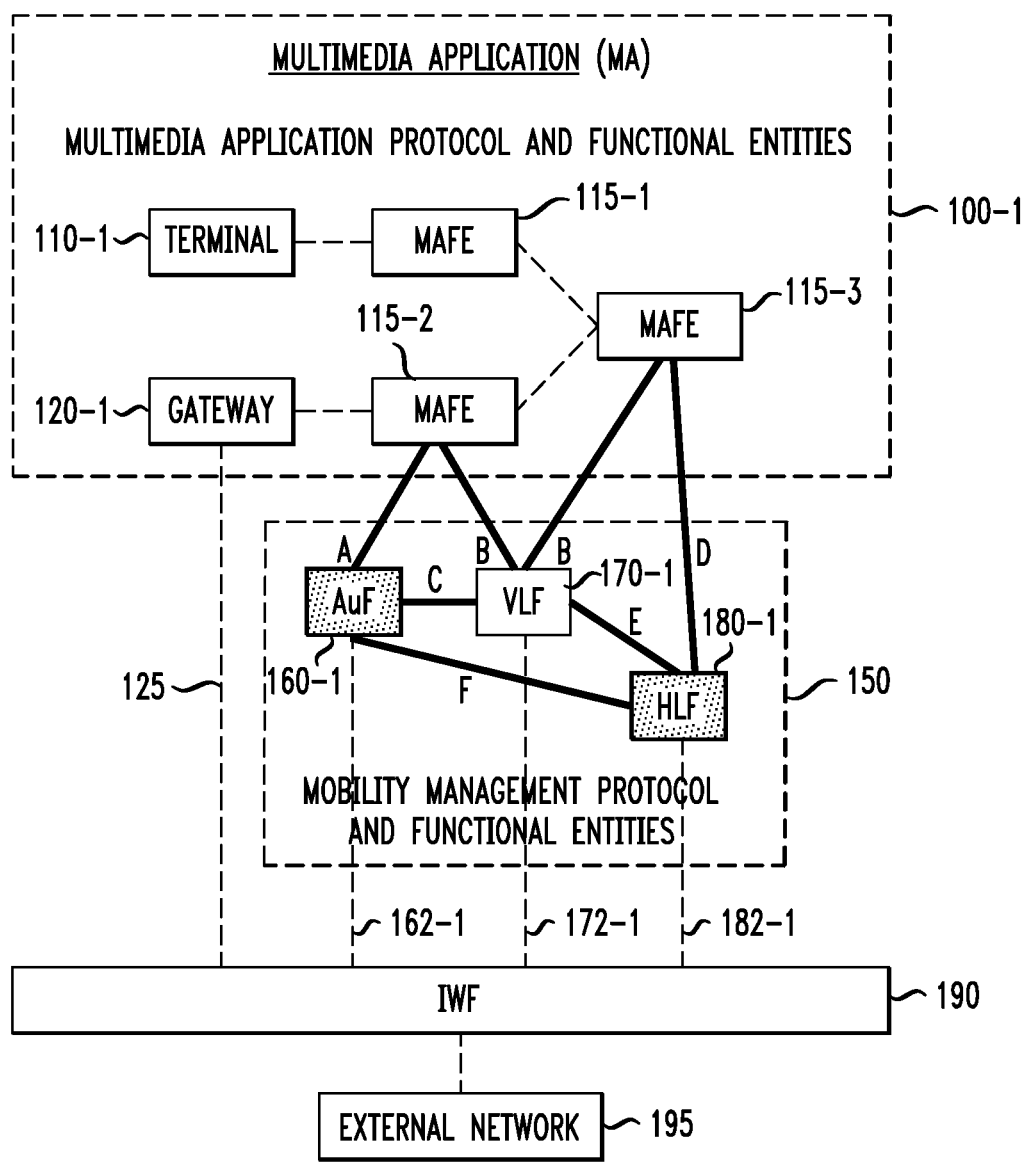
FIG. 1 is a simplified depiction of a given multimedia application having a plurality of multimedia application functional entities, a mobile terminal and a gateway in relation to an architecture comprising a plurality of mobility management functional entities showing reference points A-F in which messaging is accomplished utilizing a common mobility management protocol according to the present invention.

My patent application entitled, "Framework for Extensions of Multimedia Applications, Systems and Services to Support Terminal Mobility," filed concurrently herewith and incorporated herein by reference as to its entire contents, describes that all multimedia applications (MA) have or will have multimedia application functional entities (MAFEs) [for example, gatekeepers (GKs) and border elements (BEs) in H.323] for communications with corresponding mobile terminals (MTs) that invoke the multimedia applications such as mobile terminal 110-1 of FIG. 1. As explained in the BACKGROUND OF THE INVENTION section, a mobile terminal 110-1 may be without limitation any terminal that may be moved from one location to another and communicate with a network by a wired and/or a wireless link. A mobile terminal of one type, such as a personal computer, may communicate with a network server or may communicate with another fixed or mobile terminal of another type such as a POTS telephone or a paging device. As would be understood by those of skill in the art, such a mobile terminal, a computer, or a device can have a processor, input and output mechanisms and a bus. Software modules encoded on physical computer-readable media such as a hard drive and RAM can control the processor to perform the steps disclosed herein. Also, multimedia applications 100-1 to 100-n mentioned below are mentioned by way of example, and it should be clear that other multimedia applications, either existent such as H.324 POTS videoconferencing or applications developed in the future are contemplated within the scope of the present invention. Each multimedia application (MA) 100-1 will use its own communications protocol between the mobile terminal (MT) 110-1 and the MAFE 115 (of which three are shown). Databases/servers that will be used for value-added mobility services residing behind the MAFE 115 are generally referred to as the home location function (HLF) 180, visitor location function (VLF) 170, and authentication function (AuF) 160. The HLF, VLF, and AuF are called mobility management functional entities (MMFEs) and utilize a common mobility management protocol according to the present invention. In the present application, a common mobility management protocol that will be used by all multimedia applications is discussed in detail and is a focus of the present disclosure.

Features and Capabilities of a Common Mobility Management Protocol

All multimedia applications/systems that need mobility support for communications among the HLF/VLF/AuF databases will require the following features:

Terminal, Functional, and Logical Entity Profile:

There are defined below a number of common concepts that are assumed to be shared among multimedia applications.

User Identification (Alias Address): Permanent user identity (E.212—international mobile user identity [IMUI]), international mobile subscriber identity [IMSI], temporary user identity (E.212: IMUI with short lifetime), callable user identity (E.164: international mobile directory number [IMDN], RFC 2486 [email address, UR], etc.), and others comprise known means of identifying a particular user or providing an alias address for the user intelligible to a given application. There typically will exist for any future multimedia application a user identification (alias address).

Terminal Identification (identity and [home, visited (serving), previously visited] routing address): International mobile equipment identity (IMEI), terminal type (Q.767), H.323-ID, mobile station international ISDN number (MSISDN), mobile station routing number (MSRN), temporary mobile station identity (TMSI), local mobile terminal identity (LMTI), last known location and the initial location of the H.323 mobile terminal, etc. comprise known means of identifying a particular terminal that may be mobile intelligible to a given application. There typically will exist for any future multimedia application a terminal identification.

Zone Identification: H.323 (home, visited [serving], previously visited) zone identity and others are known means of locating and identifying a zone in which a terminal is presently resident. There typically will exist for any future multimedia application a zone identification Domain Identification: H.323 (home, visited [serving], previously visited) domain identity, DNS domain, and others are known means of locating and identifying a domain. There typically will exist for any future multimedia application a domain identification.

Functional Entity Identification (identity and routing address): HLF identity, (home, visited [serving], previously visited) VLF identity, AuF identity, H.323 (home, visited [serving], previously visited) gatekeeper (GK) identity, H.323 (home, visited [serving], previously visited) border element (BE) identity, session initiation protocol (SIP) proxy identity, and others comprise known means of identifying a functional entity (MAFE or MMFE). There typically will exist for any future multimedia application a functional entity identification.

Routing Addressing Format:

E.164—IMDN and roaming number, IP (RFC 2000) and following protocols will define a format for routing addressing.

Services Profile:

Subscription Profile: User language, roaming restrictions (defined by operator), terminal restrictions comprise known means of defining a subscription profile for a given service subscription.

Service Status Service granted, service barring (operator determined), service granted are known means of defining a status of a given service with respect to a given subscriber.

Traffic Parameters Commonly known traffic parameters are known according to well known traffic engineering practices.

Basic Call: A basic call is a well known end-to-end telecommunications connection.

Call Transfer: Call transfer is a well known feature whereby a call may be transferred to another subscriber or terminal.

Call Diversion: Call diversion is a well known feature whereby a call may be diverted/routed from an intended destination to another.

Call Hold: Call hold is the well known feature of placing a call on hold.

Call Waiting: Call waiting is the well known feature of announcing a call that is waiting for connection during a pending connection.

Call Parking: Call parking is the well known feature of temporarily placing a call in a call hold like state but typically a code is required to retrieve the call from another terminal.

Call Intrusion: Call intrusion is the well known feature of permitting a call to intrude on an existing call.

Calling Name Presentation: Calling name presentation is the well known feature of presenting a calling name.

Called Name Restriction: Called name restriction is the well known feature of restricting calls to a called name.

Selective Call Rejection/Acceptance: Selective Call Rejection/Acceptance is the well known feature of selectively rejecting or accepting a call typically by calling terminal address among other means of selective call rejection/acceptance.

Message Waiting: Message waiting is the well known feature of announcing the state of a message waiting at a given terminal.

Web-based Services: Web-based services comprise the collection of services available via the world-wide web.

Unified Messaging: Unified messaging, also called integrated messaging, is the known service of announcing all messages, for example, facsimile, voice, multimedia, e-mail messages and the like.

Transport Services: Transport Type (Network: circuit-switched, packet switched [IP, ATM], System: Wireless LAN, Wire-line, 2G, 3G, GSM, UMTS, ANSI-41, H.323, SIP) and Transport Capabilities (QOS criteria, routing capability, IN capability, etc.) comprise some of the known types of transport services. There will exist a transport service for a multimedia application in the future.

In light of the above, the general mobility management protocol characteristics that are required for all multimedia applications can be described as follows: Address Resolution, Routing, Location Update, and Authentication. Consequently, a common mobility management protocol utilized by all multimedia applications must provide for these characteristics.

According to the present invention, a common mobility management (hereinafter referred to as H.management) protocol will provide for inter-entity messaging. That is the messages will contain fields for data parameters that may be utilized to provide the above-described functional features, characteristics and capabilities.

Referring to FIG. 1, there is provided a high level architectural view of the present invention shown in bold block 150 which includes Mobility Management Functional Entities (MMFE) which communicate via a common mobility management protocol according to the present invention among themselves and with Multimedia Application Functional Entities (MAFE) for each of a plurality of different multimedia applications (MA) 100-1 to 100-n of which only MA 100-1 is shown. There are shown a number of reference points A-F and dashed and solid lines and boxes representing entities and signaling among the mobility management functional entities (MMFEs): HLF, VLF, and AuF and to a Multimedia Application Functional Entity (MAFE) for a given multimedia application (MA) 100-1. As described in my concurrently filed patent application, known MA's include H.323 multimedia, global multimedia and presence/instant messaging multimedia applications by way of example among others. Not shown are H.324 POTS video-conferencing and H.320 ISDN video-conferencing applications among others too numerous to mention or not yet developed. There may be many multimedia applications, of which only one, MA 100-1, is shown.

Protocol Description (H.management)

A common mobility management protocol (H.management) according to the present invention will be used by all multimedia applications/systems that need to support mobility for maintaining the communications among home location function (HLF) 180-1, visitor location function (VLF) 170-1, and authentication function (AuF) 160-1 databases/servers shown in bold dashed line box 150. FIG. 1 indicates a number of reference points A-F representing signaling among the HLF, VLF, and AuF databases/servers for any given multimedia application (MA) 100-1 wherein points A, B and D represent those that will be used between multimedia application functional entities (MAFE) and the AuF, VLF and HLF using the H.management protocol of the present invention while points C, E and F represent points between AuF, VLF and HLF to provide mobility related value added services. As will be described in connection with FIGS. 4-10, messaging at the H.management protocol level to interface with and among MMFE's is simplified and more efficient than if mobile terminals were required to adapt to extensions of each existent application protocol with which it may interface anywhere a mobile terminal 110-1 may relocate to in the world.

The reference Points can be Described as Follows:

A—Between Multimedia Application Functional Entity (MAFE) 115-2 for a given multimedia application MA 100-1 and Authentication Function (AuF) database/server AuF of mobility management functional entity box 150.

B—Between Multimedia Application Functional Entity (MAFE) 115-2 and Visitor Location Function (VLF) database/server 170-1.

C—Between Authentication Function (AuF) 160-1 and Visitor Location Function (VLF) 170-1 database/servers of mobility management functional entities box 150.

D—Between Multimedia Application Functional Entity (MAFE) 115-3 and Home Location Function (HLF) 180-1 database/server.

E—Between Visitor Location Function (VLF) 170-1 and Home Location Server (HLF) 180-1 database/servers.

F—Between Authentication Function (AuF) 160-1 and Home Location Server (HLF) 180-1 database/servers. A further reference point is not shown in FIG. 1 but may be seen in FIG. 3.

G—Between two Home Location Server (HLF) databases/servers (not shown in FIG. 1 for simplicity)

Figure 2:
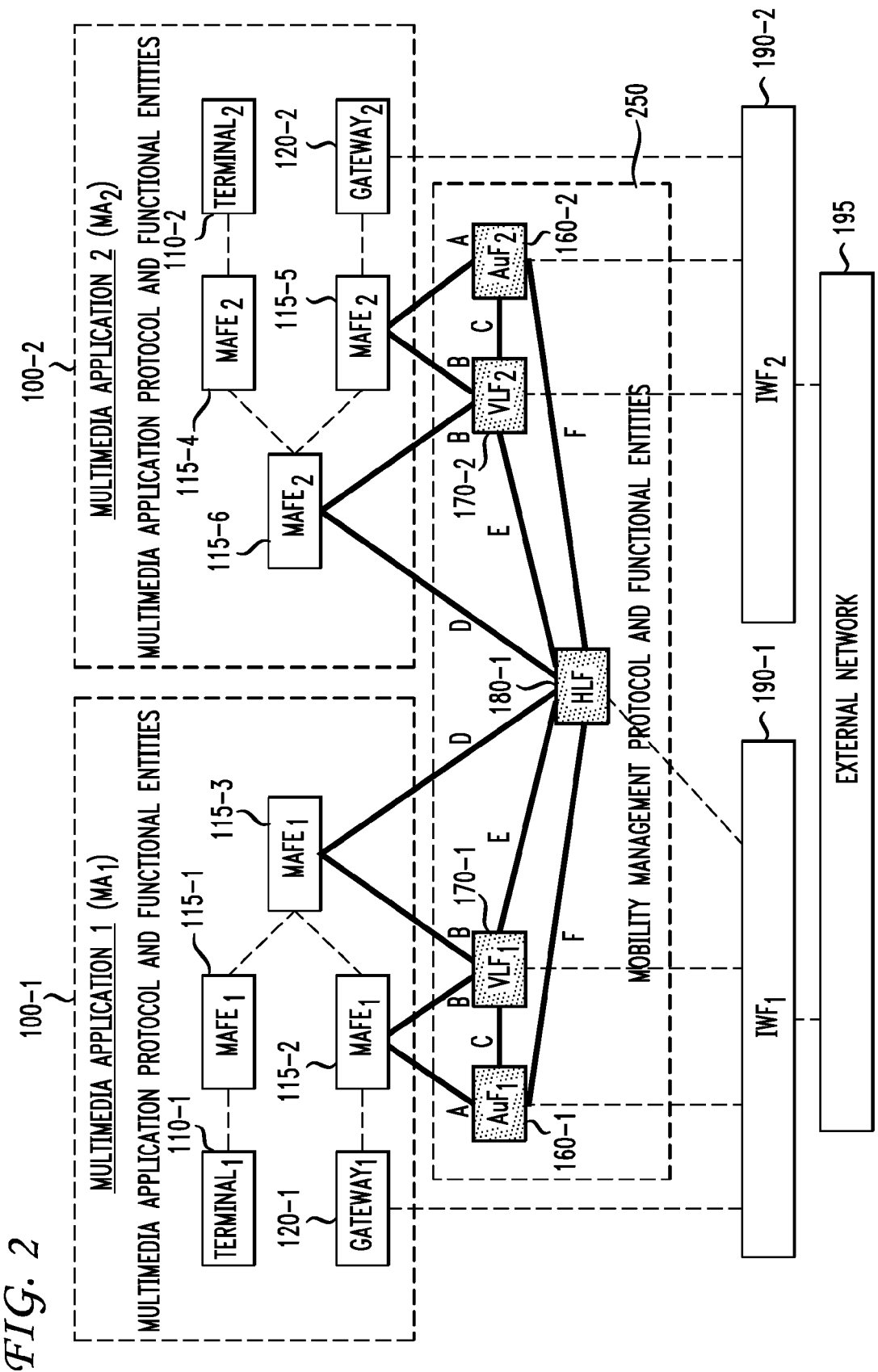
FIG. 2 is a simplified depiction of two, for example, two different multimedia applications communicating with a centralized home location function architecture 250 and in turn with first and second interworking functions according to the present invention showing all reference points A-F as shown in FIG. 1.
Figure 3:
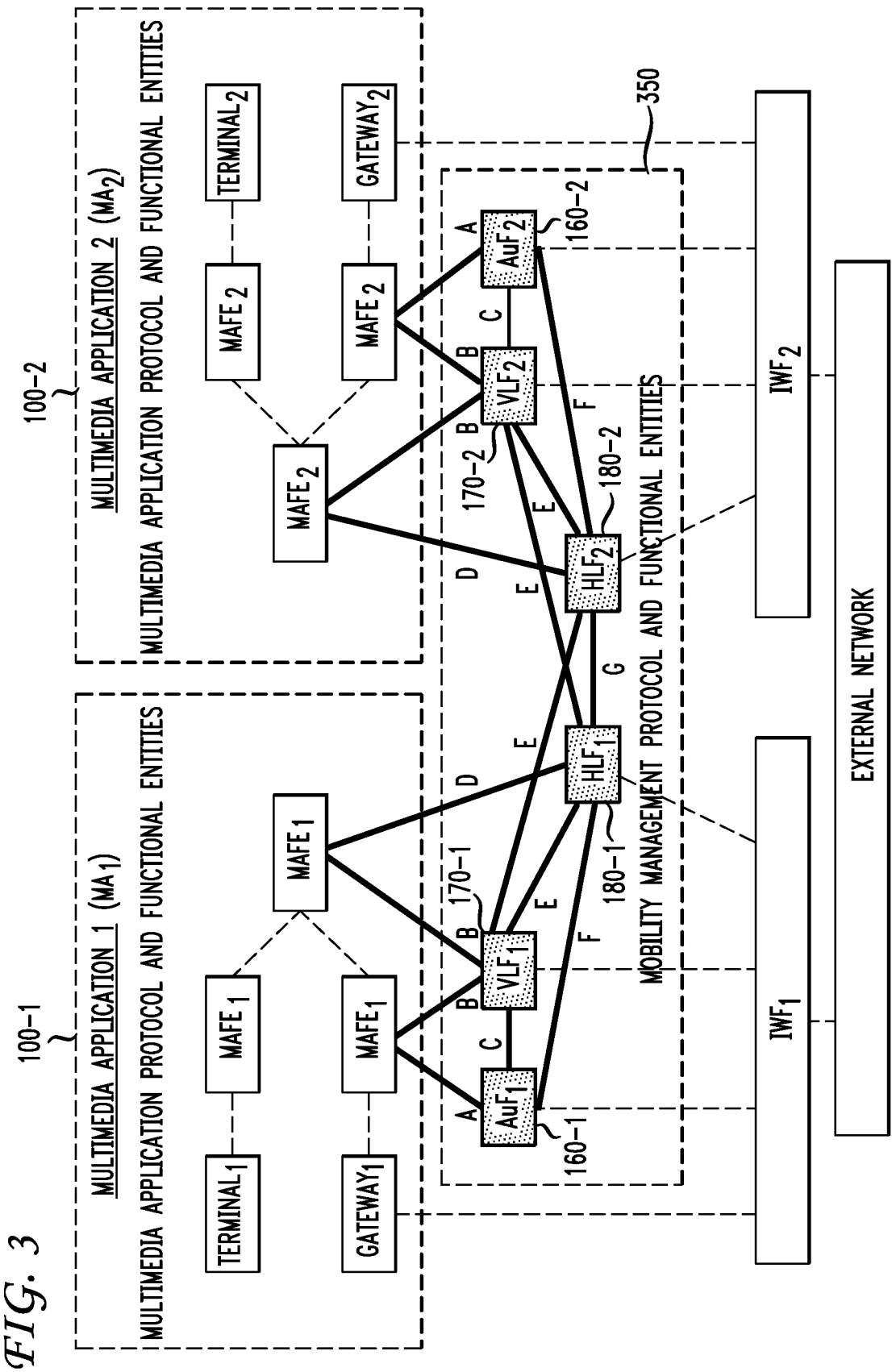
FIG. 3 is a simplified depiction of a distributive architecture 350 where plural home location functions communicate with plural interworking functions and a new reference point G is shown for signaling between home location functions.

Reference points A, B, C, D, E, F, and G are the focus of the common mobility management (H.management) protocol of the present invention. MAFE's 115 and mobile terminal 110 for a given multimedia application 100-1 use their own protocol for messaging or one enhanced for working with another protocol as described in my concurrently filed patent application. If we consider a multimedia application like H.323, a MAFE can be a gatekeeper (GK) 120-1 or border element (BE). Similarly, all other known and future multimedia applications (MA) 100 can also consider their own functional entities. However, all multimedia applications 100 will be using the same common mobility management (H.management) protocol according to the present invention for messaging reference points A, B and D. For a given multimedia application 100, there can be multiple domains using a hierarchical/centralized or distributive HLF and VLF architecture as will be further discussed below. With reference to FIGS. 2 and 3, there can also be multiple multimedia applications (MA) sharing the same hierarchical/centralized or distributive HLF and VLF architecture 150.

The common mobility management (H.management) protocol does not mandate a specific system architecture 150 among AuF 160-1, VLF 170-1, and HLF 180-1. There can be one or multiple AuF, VLF, and HLF functional entities (only one each being shown in FIG. 1) and the communications among these entities can be of any form for a single or multiple applications: Centralized/Hierarchical or Distributive.

Also, FIG. 1 shows interworking function (IWF) 190. IWF 190 comprises signaling links 125 for signaling a known gateway 120-1 for a given MA 100-1. Moreover, interworking function 190 comprises links 162-1, 172-1 and 180-2 for interworking with mobility management functional entity architecture 150. Interworking function 190 is shown linked to external networks 195 which may be any other network with which a multimedia application may interwork. Consequently, it is shown that the present H.Management protocol may work in parallel or in series with any existent interworking functionality (IWF) 190 to achieve similar results in a more efficient manner.

FIG. 2 depicts an example configuration where two multimedia applications ($MA_1$ and $MA_2$) are using a single HLF 180-1 in a centralized architecture. By centralized architecture is meant the utilization of one and only one home location function 180-1 in centralized architecture 250. Similar reference numerals have been used in FIG. 2 to depict similar elements in FIG. 1. Now two multimedia applications 100-1 and 100-2 are shown invoked by different terminals 110-1 and 110-2 respectively. However, both applications are using the same mobility management (H.management) protocol within centralized MMFE architecture 250. Multimedia application 100-1 comprises terminal 110-1, MAFE's 115-1 to 115-3 and gateway 120-1. Multimedia application 100-2 comprises mobile terminal 110-2 MAFE's 115-4 to 115-6 and gateway 120-2. Two interworking functions are shown, IWF 190-1 and 190-2 for connection to external networks 195. While these interworking functions are shown, they may not in fact exist and the depicted centralized architecture 250 may provide equivalent functionality. The same reference points A-F are shown in FIG. 2. As in FIG. 1, there is no reference point G shown because there is only one home location function 180-1. The centralized architecture may, for example, be utilized for providing multimedia application terminal mobility among any two different multimedia applications within a geographical area such as a whole country or significant portion of a highly populated country.

FIG. 3 depicts a distributive HLF architecture 350 where multiple HLFs are being used by two multimedia applications ($MA_1$ and $MA_2$) 100-1 and 100-2. Such an architecture may represent for example the application of the present invention globally, throughout the world. Similar reference numerals are used in FIG. 3 to depict similar elements. The primary change between FIG. 2 and FIG. 3 is the depiction of first home location function 180-1 and second home location function 180-2 connected by reference point G. Now, there can also be communications among plural HLFs via a G interface, now shown by way of example in FIG. 3. For example, HLF 180-1 may be located in Japan and HLF 180-2 may be located in the United States. It may be noted that there can be any number of different multimedia applications (MA) in the above architectural configurations of FIGS. 1-3 and a given multimedia application may have single or multiple domains. The protocol that is being used among the AuF, VLF, and HLF functional entities (MMFE) within block 350 for all configurations still remains the same common mobility management (H.management) protocol of the present invention.

Addressing Schemes

The addressing convention used in the common mobility management protocol (H.management) needs to interwork with the multimedia applications that will be using the mobility management protocol. For example, in H.323, email-id and partyNumber (using PublicNumber with PublicTypeOfNumber of internationalNumber) types of AliasAddress need to be supported as well as the private local numbers. Then, these numbers may be used in messages as these are understood among the AuF, VLF, and HLF functional entities due to some a priori agreements.

The alias addresses may also contain functional entities, logical boundaries, and other kinds of identifications. For example, in H.323, there can be gatekeeper (GK), border element (BE), zone, and domain identification data included in the address.

Similarly, if there are other applications that need to be supported and their addressing schemes are different, those addressing formats will also be accounted for in the addressing scheme.

Protocol Operation

The mobility management (H.management) protocol according to the present invention will be using address templates and descriptors to carry the address information. The location of the AuF, VLF, and HLF databases need to be known for the protocol operation among these mobility management functional entities (MMFE). Finally, the address resolution of the mobile terminal users is a key of the protocol operation. The detailed operation of the H.management protocol is described subsequently herein in greater detail.

It is assumed that the multimedia application functional entities (MAFEs) 115 will communicate among themselves using the respective multimedia application-specific protocols. HLFs will advertise the user identities (i.e., their addresses) in their databases to the mobility management functional entities (MMFEs) [e.g., HLFs, VLFs] and the multimedia application functional entities (MAFEs) [e.g., GKs, and BEs of H.323, or MAFEs of IMT-2000, Presence, and Instant Messaging) among other multimedia applications using the mobility management (H.management) protocol.

For example, H.323's MAFEs like GKs and BEs will be using H.225.0 RAS and Annex G protocol among themselves. However, those GKs and BEs will be using the MMFE VLF, HLF, and AuF databases for storing all the information related to the mobile terminal users to complete the calls.

Address Templates and Descriptors

An address template ("template" for short) defines a set of AliasAddress identifiers and/or the services profile information to complete calls to those addresses, and the specific protocol to be used in reaching addresses in that set for the mobile users of multimedia applications that need to support mobility. Templates are grouped together by an identifier which may be referred to as a "descriptor". Once a template is grouped by a descriptor, any change to a template under that descriptor implies a change to the descriptor "group". Template information may allow the aggregation of addressing information if the addressing scheme is arranged in some hierarchical or routable manner (for example, a given zone might handle 1303538*, meaning all telephone numbers that begin with 1303538). (Note that since "*" is a meaningful character, the template actually includes a Boolean flag, for example, a single bit, to indicate whether the address is specific or not. These examples use "*" to indicate a wild card, but the actual representation in the template is through the Boolean flag.)

Template Examples Include:

"For 1 555 123 4567 send Address Resolution messages (e.g., location requests (LRQs), AccessRequest) to H.323 MAFEs (e.g., gatekeeper A, border element B)"

"For 1 555 987 * send Address Resolution messages (e.g., AccessRequest) to MMFEs (e.g., VLF C)"

"For 1 555 987 * send Address Resolution messages (e.g., AccessRequest) to MMFEs (e.g., HLF A)"

"For 1 555 987 6543 send Call Setup (e.g., Setup) message to H.323 MAFEs (e.g., H.323 gateway X)"

"For *@example.org send Address Resolution messages (e.g., AccessRequest) to MMFEs (e.g., VLF E)"

"For 1 * send Address Resolution message to IMT-2000 MAFE (e.g., MAFE Z)"

"For private 31* send Address Resolution to Presence MAFE (e.g., MAFE D)"

"For 44 171 112*'" doesn't exist"

An MMFE or MAFE obtains templates in one of the following ways: static configuration, receiving descriptors from other MMFEs or MAFEs in response to general requests and receiving responses to specific queries.

Static Configuration

An MMFE or MAFE database will maintain templates in a way for which it is responsible. These templates may be explicitly provisioned in the MMFE or MAFE, or these templates may be formed by summarizing information obtained from the functional elements within its logical boundaries (e.g., H.323 zones, H.323 domains, DNS domains/zones). An MMFE or MAFE may make this information available to other MMFEs and MAFEs via responses to requests.

Receiving Descriptors

An MMFE or MAFE may request statically configured templates from another MMFE or MAFE. The response to the request is decided by the MMFE or MAFE from which the templates are being requested.

To request a transfer, the MMFE or MAFE sends a DescriptorRequest message specifying the descriptors it wishes to receive. If the owning MMFE or MAFE database is able to transfer the descriptors, it responds with a DescriptorConfirmation message specifying all the templates according to the protocol.

The requesting MMFE or MAFE may cache a copy of a template received in this manner until a lifetime associated with the template expires, at which point the MMFE or MAFE should delete its copy of the template. If the owning MMFE or MAFE database changes its statically configured templates before their lifetime has expired, then, it shall send a DescriptorUpdate message to those MMFEs or MAFEs of which it is aware. An MMFE or MAFE in receipt of a DescriptorUpdate message should delete, add, or change all indicated templates in its cache, or should request copies of the indicated descriptors from the owner.

An HLF may indicate itself as the contact for an AccessRequest message even though the descriptors it receives from another MMFE or MAFE indicate that another MMFE or a MAFE is the contact.

An MMFE or MAFE may indicate in a template the requirement for an originator to receive permission to place a call into an administrative or logical boundary (e.g., zones/domains of H.323, zones/domains of DNS). When a callspecific flag is set in a template and the message type indicates that an AccessRequest message shall be sent, the originator shall provide per-call information in the AccessRequest message. If an MMFE or MAFE receives the AccessRequest message without per-call information and there exists a policy to require per-call information, the border element or other MAFE shall reply with an AccessRejection message with a reason of needCallInformation.

An MMFE or MAFE may send a DescriptorUpdate message to other known MMFEs or MAFEs, or the MMFE or MAFE may multicast a DescriptorUpdate message. If a DescriptorUpdate message is multicast, the MMFE or MAFE should consider the scope of the multicast. The DescriptorUpdate message can contain the descriptors that have changed. Alternatively, the DescriptorUpdate message may indicate only the identification of the descriptors that changed, allowing the recipient to query for the new information. If a large number of descriptors have changed, the information may preferably be sent in multiple DescriptorUpdate messages so that a particular DescriptorUpdate message does not exceed the maximum transport packet size.

Receiving Response to Specific Queries

An MMFE or MAFE may send an AccessRequest message to another MMFE or MAFE asking for the resolution of a fully qualified or partially qualified address. The AccessRequest is usually sent over unreliable transport (e.g., UDP), although it may be sent over reliable transport (e.g., TCP).

An MMFE or MAFE in receipt of an AccessRequest searches its database and responds with the most specific template for the destination. If multiple templates satisfy the request then the MMFE or MAFE shall return all matching templates. If the destination border element is actually responsible for the alias address specified, the MMFE or MAFE will usually respond with a template indicating that either an AccessRequest or call setup message (e.g., Setup in H.323) should be sent. If the destination MMFE or MAFE is an HLF, it will normally respond with a template indicating that the AccessRequest message should be sent.

The destination MMFE or MAFE may also add templates to the response which it believes will be useful in the future. The addition of these templates should not make the response so large that the transport network will need to fragment it (e.g., 576 octets for IPv4 or 1200 octets for IPv6).

For example, an MMFE or MAFE which is tightly coupled with a firewall may provide two templates in its response to AccessRequest messages: one template with a short lifetime (of a few minutes or seconds) specifying the location to which a call setup (e.g., Setup in H.323) message should be sent, and additional templates specifying that AccessRequest messages should be sent to the MMFE or MAFE for other AliasAddresses within the administrative or logical boundary (e.g. zones/domains in H.323 or DNS) that may have different lifetimes.

An MMFE or MAFE may cache a template received in an AccessConfirmation until its associated lifetime expires.

Location of Databases/Servers

An MMFE or MAFE may have an administered set of other border elements which it may contact for address resolution. This administered set may be defined through a set of bilateral agreements between the administrative domains and other administrative or logical boundary (e.g. zones/domains in H.323 or DNS).

On IP networks, Ownership of Email-ID style addresses is defined by the DNS system. Thus, in the absence of any better information, a border element may do a DNS SRV record lookup on the part of the email-ID to the right of the '@' sign (for example, a DNS SRV lookup on _h2250-annex-g._udp.example.org for person example.org in H.323). The response to this lookup should be used to synthesize a "Send AccessRequest" template which can be used during the resolution process. Templates synthesized from DNS requests preferably should not be cached for longer than the lifetime provided in the DNS response.

Other methods to locate another MMFE or MAFE may come to mind of one of ordinary skill in the art.

Resolution Procedures

When an MMFE or MAFE is asked to resolve an AliasAddress, it finds matching templates in its cache. If more than one template matches, appropriate templates are selected and sorted according to local policy. For example, templates may be first sorted by wildcard length (more specific templates are better), then sorted by the type of protocol specified (for example, "Send call setup [e.g., Setup in H.323]" is better than "Send AccessRequest"). If multiple templates satisfy the request then the MMFE or MAFE shall return all matching templates.

If the template selection procedure produces no templates marked as "Send call setup [e.g., Setup in H.323]," then the MMFE or MAFE sends an AccessRequest message with a specific destination address to the address specified in the template. When it gets an answer from the MMFE or MAFE it may store that in its cache and return to the requester the address to which to send the call setup [e.g., Setup in H.323] message.

A ServiceProfileRequest message shall be sent when an MMFE or MAFE requires information related to the mobile user's services profiles.

Messages in the Mobility Management (H.management) protocol may be sent over an unreliable transport service (e.g., UDP) or a reliable transport service (e.g., TCP) to a well-known address. On IP networks, a well-known, predetermined port identified by port number should be used for both TCP and UDP, unless another port has been communicated to the sender. Border elements shall listen on both TCP and UDP ports.

When messages are sent over the reliable transport service, multiple messages may be sent within the boundaries defined by the reliable transport protocol data unit (PDU) defined by TPKT as long as whole messages are sent.

When using unreliable transport service is used, request messages may be retransmitted. The default value of the retransmission timer should determined by an adaptive delay sensitive method (such as the one used by the TCP protocol). Exponential backoff shall be used for subsequent retransmissions. The number of retransmissions, for example, shall not exceed five in number. Responses preferably shall not be retransmitted In UDP IP implementations, messages shall also be prefixed with TPKT headers, to enable multiple messages per packet. The UDP packet length field shall hold the total length of the payload, including all the messages and their TPKT headers.

When authentication, integrity, and encryption is desired for messages exchanged between border elements, the operation of IP security shall be followed, for example, as described in IETF RFC 1825 ("Security Architecture for the Internet Protocol"), including either, or both, of IETF RFC 1826 ("IP Authentication Header"), and IETF RFC 1827 ("IP Encapsulating Protocol").

Where appropriate, the procedures and constructs of H.235 shall be utilized to support application-level security. Specifically, the token formats and authentication exchanges shall be used. Tokens and crypto-tokens received in response messages should be used in a subsequent related request.

Message Definitions

Each message contains a set of common fields in addition to the message-specific information. The common fields are:

| Field | Description |
| --- | --- |
| sequenceNumber | Each request or update message contains a unique sequence number. The message sent in response to a request message (a confirmation or rejection message) uses the sequence number from the request message. Retransmitted messages shall have the same sequence number. |
| ReplyAddress | This is the address to which to send the reply to a request message. Any request message shall include a replyAddress, unless the request was sent over a bi-directional connection-oriented transport (e.g. TCP). Any message other than a request message shall not include a replyAddress. |
| Version | Protocol version in use by the sender of this message |
| hopCount | This defines the number of border elements through which this message may propagate. When a border element receives this message and decides that the message should be forwarded on to another border element, it first decrements hopCount. If hopCount is then greater than 0, the border element inserts the new hop count value into the message to be forwarded. If hopCount has reached 0, the border element shall not forward the message. If the message is a request, the border element should respond with a confirmation message with any applicable information. If no information is available, the border element should respond with a rejection message. |
| IntegrityCheckValue | Provides improved message integrity/message authentication. The cryptographically based integrity check value is computed by the sender applying a negotiated integrity algorithm and the secret key upon the entire message. Prior to integrityCheckValue computation each byte of this field shall be set to zero. After computation, the sender puts the computed integrity check value in the integrityCheckValue field and transmits the message. |
| Tokens | This is some data which may be required to allow the operation. The data shall be inserted into the message if available. |
| cryptoTokens | Encrypted tokens |
| nonStandard | Non standard information |
| serviceID | This identifier identifies a particular service relationship session between the MMFEs/MAFEs and globally unique. |

A Descriptor

The Descriptor is not a message, but is rather a message element used to label a set of templates.

The Descriptor Contains the Following Information:

| Field | Description |
|---|---|
| descriptorInfo | This holds a unique identifier for the descriptor and the time it was last changed (see Descriptor Information below). |
| templates | This is a set of templates which define the addresses this descriptor can resolve. |
| functionalEntityID | This is a text identifier that indicates the owner of the descriptor (i.e., the MMFE or MAFE that created this message) |

Descriptor information uniquely identifies the descriptor and indicates the last time the descriptor changed.

| Field | Description |
|---|---|
| descriptorID | This is a globally unique identifier used to identify this descriptor from among many possible descriptors. |
| lastChanged | This is the date and time this descriptor was last changed. |

Address Template

The Address Template describes a set of one or more alias addresses. The Template is not a message, but is an element used as a building block for other elements. The Template consists of other structures, which are described in further detail below.

| Field | Description |
|---|---|
| Pattern | This is a list of patterns (see Pattern below) . . . |
| RouteInfo | This is a list of route information for this template (see Route Information below). |
| TimeToLive | This indicates the time, expressed in seconds, for which this template is valid. |

Route Information

The route information structure found in the template (the routeInfo field) contains the following:

| Field | Description |
|---|---|
| MessageType | This indicates the type of message to send when attempting to resolve a specific address within this template. Possibilities are sendAccessRequest, send call setup message (e.g., Setup in H.323), or nonExistent (indicates that the address does not exist). |
| CallSpecific | If set to TRUE, authorization is requested for each call to this route, implying that the AccessRequest message shall include the call information. This boolean field has meaning only when messageType is sendAccessRequest; otherwise, callSpecific shall be set to FALSE. |
| contacts | This is contact information for the element that will accept the message as specified in the messageType field of routeInfo. The contact information may be provided as a list of possible contacts (see Contact Information description below). |
| Type | This indicates the type of endpoint that can serve the call. For MAFE (e.g., gatekeeper in H.323) routed cases, this indicates the types of endpoints served by the MAFE (e.g., gatekeeper in H.323) rather than the gatekeeper itself. |

Contact Information

The Contact Information structure introduced above is an element of the Route Information structure (the contacts field).

| Field | Description |
|---|---|
| transportAddress | This is the address (e.g., transport address or URL) to which to send the message specified in the messageType field of the Route Information structure. Whenever possible, a transport address shall be used. |
| Priority | When multiple contacts are listed, the priority field specifies the order in which the multiple contacts should be tried. Contacts in the list can share a priority, for example if there is no preference on the order in which the contacts should be tried. A priority of 0 indicates the highest priority (first choice). |
| transportQoS | Indicates where the responsibility lies for resource reservation for the all made through this contact . . |
| Security | Security mechanism in describing order of preference to be used when communicating with contact. |
| AccessTokens | This is a set of tokens that shall be passed in the message to this contact (call setup message [e.g., Setup in H.323] or AccessRequest). |

Pattern

The Pattern structure appears in the Address Template. The Pattern allows specification of an alias address, a wildcarded alias address, or a range of alias addresses:

| Field | Description |
|---|---|
| Specific | This is a specific alias address. |
| Wildcard | This some hierarchical definition that represents possible expansion of the string. For E.164 numbers this expansion is possible at the end of the number; for email addresses the expansion is possible at the beginning. For example, if wildcard is "+1 303", the pattern could represent any number in the Denver area code. |
| Range | This is a range of addresses, including the indicated start and end of range. |

Common Structures

Common structures include AlternateMobileEntity, PartyInformation, CallInformation, UserInformation and Security Mode.

The AlternateMobileEntity is Described as Follows:

| Field | Description |
| --- | --- |
| contactAddress | This is the alternate MMFE's or MAFE's transport address (the address to which to send mobility management (H.management) protocol messages). |
| Priority | When multiple alternates are listed, the priority field specifies the order in which the multiple alternates should be tried. Alternates in the list can share a priority, for example if there is no preference on the order in which the alternates should be tried. A priority of 0 indicates the highest priority (first choice). |
| elementIdentifier | This alternate border element uses this unicode string as an identifier. |

PartyInformation is a structure containing information about a party of the call (either source or destination).

| Field | Description |
| --- | --- |
| logicalAddress | E-mail or E.164 formatted addresses that identify the party. |
| domainIdentifier | An alias address identifying the AD which originated, or terminated the call. In case where multiple domains are involved in placing a call, then the domain that served as the call origination or termination from the sender's perspective should be stated. |
| transportAddress | This is the transport address of the endpoint. |
| endpointType | This indicates details about the endpoint type and capabilities. |
| userInfo | This is information regarding the user behind the call. This may include identification in e-mail or PIN number format, and possible authentication credentials. |
| timeZone | This is the Time zone of the party, as relevant for pricing purposes. If the originating party is a gateway, then the time zone of the gateway has to be conveyed. Described in seconds relative to UTC. |

CallInformation is defined as information for identifying a specific call.

| Field | Description |
| --- | --- |
| callIdentifier | This provides unique identification of the call. This shall be the callIdentifier associated with the same call as in MAFE's signaling messages (e.g., H.225.0 RAS in H.323) and call signaling (e.g., H.225.0 Q.931 in H.323) messages. |
| conferenceID | This provides unique identification of the conference to which the call belongs. This shall be the conferenceID associated with the same call as in MAFE's signaling messages (e.g., H.225.0 RAS in H.323) and call signaling (e.g., H.225.0 Q.931 in H.323) messages. |

UserInformation is information for identifying the user on any party of the call.

| Field | Description |
| --- | --- |
| userIdentifier | Uniquely identifies the user. |
| userAuthenticator | Encrypted tokens for secure authentication. |

SecurityMode is defined as a specific security profile to be used for Mobility Management (H.management) protocol.

| Field | Description |
| --- | --- |
| authentication | This indicates the authentication mechanism to be used. The authentication mechanism must be chosen from the set provided in the ServiceRequest message. |
| integrity | This indicates the integrity mechanism to be used. If present, all subsequent messages shall populate the integrityCheckValue field, in this case, the AuthenticationMode describes the way the secret keys are generated (DH exchange, or a-priori). |
| algorithmOID | This indicates the encryption algorithm for the security mechanism. |

Service Request

An MMFE or MAFE may send a ServiceRequest message to another border element to establish a service relationship. The relationship defines the security mechanisms to be used between the MMFE or MAFE and allows identification of alternate, or backup, MMFEs or MAFEs. Note that the relationship is a one-way relationship. The security negotiated between the two MMFE/MAFEs is used for requests sent by the MMFE or MAFE that sent the ServiceRequest and for responses sent by the recipient of the ServiceRequest. Session keys may be generated during the process of service relationship establishment. The keys will be valid through the lifetime of the service relationship. Tokens may be used for that purpose, as defined in H.235.

The recipient of the ServiceRequest may indicate alternate MMFEs or MAFEs that the sender of ServiceRequest may try for backup service.

An MMFE or MAFE may send a ServiceRequest message to an MMFE or MAFE with which it has an existing relationship, with the intent that the terms of the original relationship be terminated and replaced with the new terms. Service relationships may have limited time to live. An MMFE or MAFE may refresh the relationship by sending a new ServiceRequest. ServiceRequest contains the following fields:

| Field | Description |
| --- | --- |
| elelementIdentifier | A string that identifies the BE that sends the request. |
| domainIdentifier | The administrative domain AD that requests the service relationship. |
| securityCapability | Set of security mechanisms that this border element can support. |
| timeToLive | The suggested lifetime in seconds for the service relationship. If not present, infinite lifetime is assumed. |

Service Confirmation

An MMFE or MAFE in receipt of a ServiceRequest message responds with a ServiceConfirmation message to indicate that it agrees to establish a service relationship. If the MMFE or MAFE already has a service relationship with the MMFE or MAFE that sent the ServiceRequest message, sending ServiceConfirmation indicates that the terms of the original relationship are terminated and replaced with the new terms.

| Field | Description |
| --- | --- |
| elementIdentifier | This is a string that identifies the border element. |
| alternates | This is a list of alternate border elements that may be contacted in the event that this border element fails to respond. |
| domainIdentifier | The AD that responds to the request. |
| securityMode | This indicates the security mechanism to be used for this service relationship. The security mechanism must be chosen from the set provided in the ServiceRequest message. |
| timeToLive | The lifetime in seconds of the service relationship as determined by the serving border element. |

Service Rejection

An MMFE or MAFE in receipt of a ServiceRequest message responds with a ServiceRejection message to indicate that it declines to establish a service relationship. If the MMFE or MAFE already has a service relationship with the MMFE or MAFE that sent the ServiceRequest message, sending a ServiceRejection message indicates that the proposed new terms have been rejected, but the terms of the original relationship remain.

| Field | Description |
| --- | --- |
| reason | This is the reason the border element rejected the ServiceRequest. Choices are:<br>Service Unavailable - This border element is not currently available for service.<br>ServiceRedirected - The list of alternate MMFEs or MAFEs should be attempted.<br>Security - This MMFE or MAFE cannot support any of the security mechanisms proposed in the ServiceRequest message.<br>Continue - indicates the subsequent ServiceRequest message be sent, in order to continue multiple stage key exchange process<br>Undefined - The reason for rejecting the ServiceRequest does not match any of the other choices. |
| alternates | This is a list of alternate border elements that might be able to honor the ServiceRequest. If the reason is serviceRedirected, at least one alternate should be provided. |

Service Release

Either an MMFE or a MAFE in a service relationship may terminate the relationship by sending the ServiceRelease message.

| Field | Description |
| --- | --- |
| Reason | This is the reason this border element terminated the service relationship. Choices are:<br>OutOfService - The border element is going out of service.<br>Maintenance - The border element is being taken out of service for maintenance.<br>Terminated - The border element has decided to terminate the relationship. |

| Field | Description |
| --- | --- |
| | Expired - the time-to-live for the service relationship has elapsed. |
| alternates | This is a list of alternate border elements that might be able to establish a service relationship. |

Service Profile Request

The service profile request message will contain the following informational elements:

```
ServiceProfileRequest ::= SEQUENCE
{
    trafficParameters         TrafficParameters,
    basicCall                 BasicCall,
    callTransfer              CallTransfer,
    callDiversion             CallDiversion,
    callHold                  CallHold,
    callWaiting               CallWaiting,
    callParking               CallParking,
    callIntrusion             CallIntrusion,
    callingNamePresentation   CallingNamePresentation,
    calledNameRestriction     CalledNameRestriction,
    selectiveCallAcceptance   SelectiveCallAcceptance,
    selectiveCallRejection    SelectiveCallRejection,
    messageWaiting            MessageWaiting,
    webBasedServices          WebBasedServices,
    unifiedMessaging          UnifiedMessaging,
    ...other services
}
```

The detail of this message depends on the service requested.

Service Profile Confirmation and Service Profile Rejection are other messages for confirming and rejecting a service request respectively.

Descriptor

Descriptor Request Message

The DescriptorRequest message allows an entity to query a border element for specific descriptors and contains the following fields:

| Field | Description |
| --- | --- |
| descriptorID | This identifies one or more particular descriptors requested by the sender of this message. |

Descriptor Confirmation

The DescriptorConfirmation message is a border element's positive response to a DescriptorRequest, when the border element can interpret the request and implementation rules allow information exchange.

| Field | Description |
| --- | --- |
| descriptors | This is the descriptors described above. |

Descriptor Rejection Message

An MMF or MAFE can reject a descriptor request for a variety of reasons.

| Field | Description |
| --- | --- |
| Reason | This is the reason the DescriptorRequest was rejected. Choices are: |

| Field | Description |
| --- | --- |
| | PacketSizeExceeded - The reply would exceed the maximum packet size, so the requester should send the request using a different transport mechanism (e.g., use TCP instead of UDP).
illegalID - The recipient of the DescriptorRequest has no record of the requested descriptor.
security - The DescriptorRequest did not meet the recipient's security requirements.
HopCountExceeded - The hop count reached zero and no information is available.
unavailable - The recipient cannot provide descriptors. Static or out-of-band provisioning method should be used.
noServiceRelationship - The recipient will exchange this information only after establishment of a service relationship.
undefined - The reason for rejecting the DescriptorRequest does not match the other choices. |
| descriptorID | This identifies the specific descriptor for this response. |

Descriptor ID Request

The DescriptorIDRequest message allows an entity to query a MMFE or MAFE for the list of descriptor identifiers within the MMFE's or MAFE's logical or administrative boundary (e.g., zone/domain of H.323 or DNS).

Descriptor ID Confirmation Message

A DescriptorIDConfirmation message is a MMFE's or MAFE's positive response to the DescriptorIDRequest message. An MMFE or MAFE in receipt of a DescriptorIDConfirmation message may send the DescriptorRequest message to request transmission of the descriptors.

| Field | Description |
| --- | --- |
| descriptorInfo | This is a list of descriptor information, where each entry in the list uniquely identifies the descriptor and the time it last changed. |

Descriptor ID Rejection Message

A MMFE or MAFE can reject a DescriptorIDRequest for a variety of reasons.

| Field | Description |
| --- | --- |
| Reason | This indicates the reason for rejecting the request. Choices are:
noDescriptors - This indicates that the border element has no descriptors to report.
security - The DescriptorIDRequest did not meet the recipient's security requirements.
hopCountExceeded - The hop count reached zero and no information is available.
unavailable - The recipient cannot provide descriptors. Static or out-of-band provisioning method should be used.
NoServiceRelationship - The recipient will exchange this information only after establishment of a service relationship.
undefined - The reason for rejecting the DescriptorIDRequest does not match the other choices. |

Descriptor Update

The DescriptorUpdate message is a MMFE's or MAFE's notification that address information has changed. A border element may also send the DescriptorUpdate message during initialization. A border element in receipt of the DescriptorUpdate may request information from the element identified in the DescriptorUpdate.

| Field | Description |
| --- | --- |
| Sender | An element in receipt of the DescriptorUpdate may send a request to this address (e.g., transport address or URL). |
| updateInfo | This is a list of updates. Each entry in the list provides either the descriptor or the descriptor identifier that was updated. Each entry in the list also indicates whether the descriptor was changed, added, or deleted. |

Descriptor Update Acknowledgement

A MMFE or MAFE should acknowledge receipt of a DescriptorUpdate message by sending the DescriptorUpdateAck message. The sequence number used in the acknowledgement should be the same as the sequence number received in the DescriptorUpdate message. A border element should not acknowledge a DescriptorUpdate message that arrives over multicast.

Access Request

An MMFE or MAFE can send an AccessRequest message to another MMFE or MAFE to ask for resolution of a specific alias address.

| Field | Description |
| --- | --- |
| DestinationInfo | This is the address to be resolved. |
| sourceInfo | This is information about the originating party of the call to which access is requested. |
| CallInfo | This provides identification of the particular call for which access authorization is requested. If not present, then the request is for indefinite calls to the specified destinations. |
| UsageSpec | This indicates the usage messages that the originating party requests the answering party to send regarding the call requested in this message. Applies only if CallInfo is present. |

Access Confirmation

An MMFE or MAFE returns in the AccessConfirmation message the information requested in the AccessRequest message.

| Field | Description |
| --- | --- |
| templates | This is a list of tempates which match the attributes of the AccessRequest. |
| partialResponse | If TRUE, this message contains some fraction of the available information. The entire information was not sent because it would exceed the packet size. The entire information should be retrieved using another transport type (e.g., TCP) |

Access Rejection

An MMF or MAFE can reject an AccessRequest for a variety of reasons.

| Field | Description |
| --- | --- |
| Reason | This is the reasons for rejecting the request. Choices are:
NoMatch - The destination specified in the AccessRequest cannot be resolved.
PacketSizeExceeded - The reply would exceed the maximum packet size, so the requester should send the request using a different transport mechanism (e.g., use TCP instead of UDP).
security - The AccessRequest did not meet the recipient's security requirements.
HopCountExceeded - The hop count reached zero and no information is available.
NoServiceRelationship - The recipient will exchange |

-continued

| Field | Description |
|---|---|
| | this information only after establishment of a service relationship.<br>CallInfoNeeded - Specific call information was not present in the request.<br>Undefined - The reason for rejecting the AccessRequest does not match the other choices. |

Request in Progress

An MMFE or MAFE may return the RequestInProgress message to indicate that the time required by the MMFE or MAFE to respond to a request may exceed normal expected response intervals. The sequence number shall be the same sequence number found in the request for which this message will be sent.

| Field | Description |
|---|---|
| Delay | The expected length of time, expressed in milliseconds, for the border element to respond to the original request |

Unknown Message Response

An MMFE or MAFE in receipt of a message it does not understand should respond to the transmitter withthe UnknownMessageResponse message. The MMFE or MAFE should not use this message if some other Mobility Management message provides an appropriate response (for example, a DescriptorRejection would be the appropriate response to a DescriptorRequest with an illegal descriptor identifier).

| Field | Description |
|---|---|
| unknownMessage | This is the contents of the unknown message. |
| Reason | This is the reason the the UnknownMessageResponse was used. Choices are:<br>notUnderstood - The message was not understood.<br>undefined - The reason for sending UnknownMessageResponse does not match any of the other choices. |

Validation Request

An MMFE or MAFE that terminates a call can send a ValidationRequest message to another border element to verify the validity of the origination of the call.

| Field | Description |
|---|---|
| DestinationInfo | Details about the destination of the call. |
| SourceInfo | This is information about the type of endpoint that originated the call. |
| CallInfo | This provides identification of the particular call for which access authorization is requested. |
| UsageSpec | If present, indicates the border element sending the message requests that it be sent usage indication regarding the validated call. |
| AccessTokens | Tokens received from the originator to prove access authorization for the call. |

Validation Confirmation

A validation confirmation message indicates that the call is validated. The requesting border element may terminate the call. The validating MMFE or MAFE may indicate aliases to terminate the call.

| Field | Description |
|---|---|
| DestinationInfo | Alternative parameters for the destination to be used by the recipient border element. |
| UsageSpec | If present, indicates the MMFE or MAFE sending the confirmation requests that it be sent usage indication regarding the validated call. |

Validation Rejection

A validation rejection message indicates the call is not valid. The requesting MMFE or MAFE may not complete the call.

| Field | Description |
|---|---|
| Reason | This is the reasons for rejecting the request. Choices are:<br>tokenNotValid - the access token supplied are not valid for the call.<br>Security - The ValidationRequest did not meet the recipient's security requirements.<br>HopCountExceeded - The hop count reached zero and no information is available.<br>MissingSourceInfo - the source information supplied was not sufficient to validate the call.<br>MissingDestInfo - the source information supplied was not sufficient to validate the call.<br>noServiceRelationship - The recipient will exchange this information only after establishment of a service relationship.<br>Undefined - The reason for rejecting the ValidationRequest does not match the other choices. |

Authentication Request

The authentication request message will contain the following information elements:

```
AuthenticationRequest ::= SEQUENCE
{
sourceInfo          PartyInformation,
tunneledMessage     ApplicationSpecificMessage, - for example
                    tunneled RAS
messages in H.323
...others
}
```

Authentication Confirmation

The authentication confirmation message will contain the following information elements:

```
AuthenticationConfirmation ::= SEQUENCE
{
encryptionToken     SEQUENCE OF
                    EncryptionToken OPTIONAL,
destinationInfo     PartyInformation OPTIONAL,
...others
}
```

Authentication Rejection

The authentication rejection message will contain the following information elements:

```
AuthenticationRejection ::= SEQUENCE
{
reason              AuthenticationRejectionReason,
tunneledMessage     ApplicationSpecificMessage OPTIONAL,
destinationInfo     PartyInformation OPTIONAL,
...others
}
```

Mobility Management Procedures

Each multimedia application (MA) as introduced above will use its own protocol for discovering its own multimedia functional entity (MAFE) [e.g., GK and BE in H.323], that is to be used by the mobile terminal for providing services to their mobile users. After discovery of the MAFE, a mobile entity will register with the MAFE for providing mobility related services. The protocol used among the MAFEs is called herein a multimedia application protocol (e.g., H.323, H.324, IMT-2000, Presence, Instant Messaging).

For example, in H.323, a mobile H.323 terminal 110 will discover a gatekeeper (GK) using GRQ/GCF/GRJ messages. A H.323 mobile entity will then register with the GK using the RRQ/RCF/RRJ messages. Then, the mobile entity will proceed with the call establishment.

MAFE Discovery

A mobile entity such as a terminal 110 of a given multimedia application will use its own internal protocol for discovery of a MAFE to provide mobility services. For example, in H.323, a mobile H.323 terminal will discover a gatekeeper (GK) using GRQ/GCF/GRJ messages. Similarly, IMT-2000, Presence, and Instant Messaging application will also do, where applicable. The discovery for each application will be protocol-specific and will be described separately for each application.

Registration with MAFE

Registration with the MAFE is needed by a mobile entity to have the services. For example, in H.323, a mobile H.323 terminal will register with the GK using RRQ/RCF/RRJ messages. Similar is the case for IMT-2000, Presence, and Instant Messaging application. The detail registration procedure for each application will be addressed separately.

Location Updating in Single Logical Boundary

Each multimedia application (MA) will have its own logical boundary. The protocol used in the logical boundary is application-specific. For example, in H.323, zones and domains have been defined as the logical boundaries, and H.323 protocol is used in those zones and domains. Similar is the case for other applications. However, the mobility management (H.management) protocol is a common protocol that is used by all multimedia applications.

Figure 4:
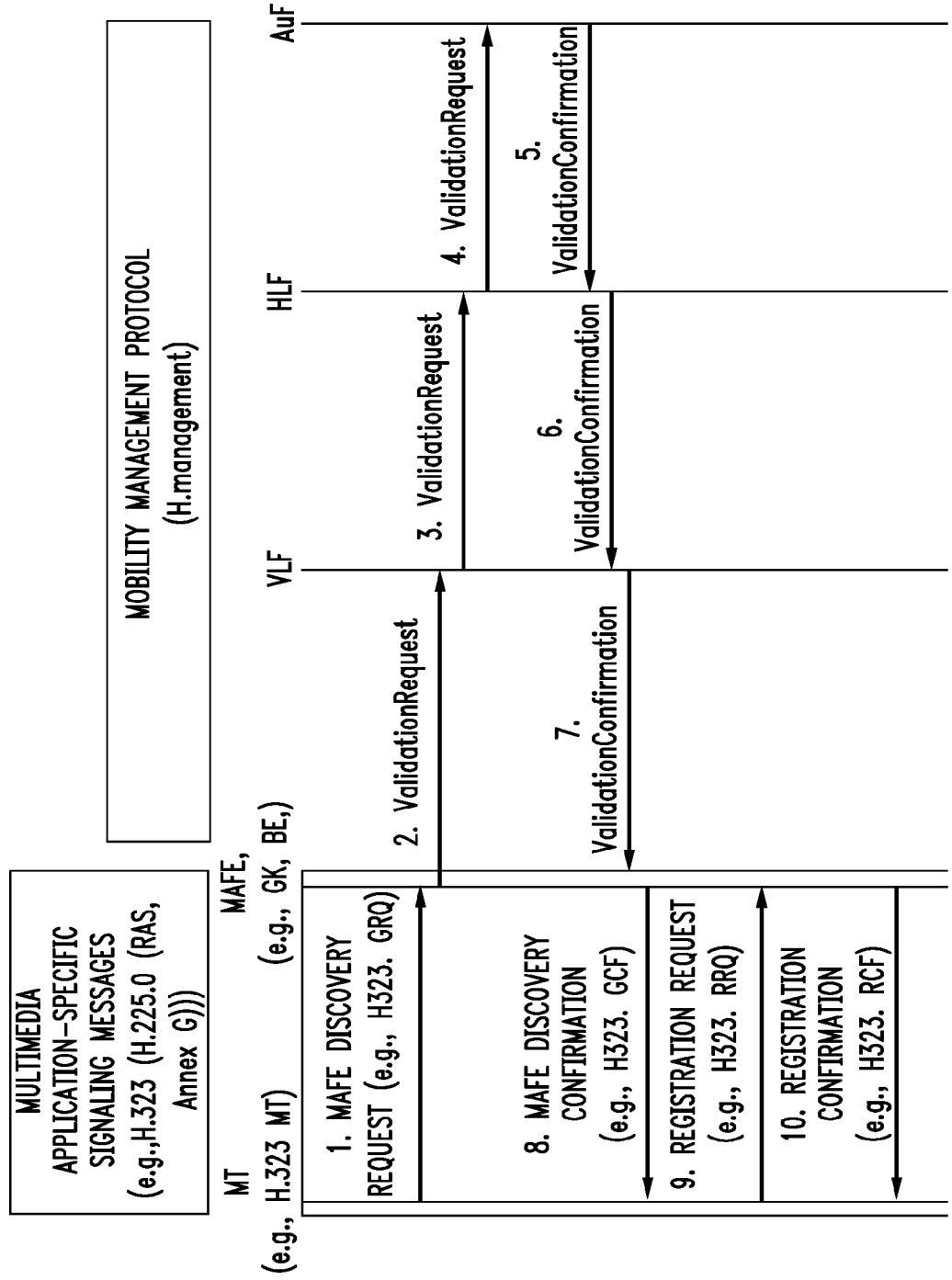
FIG. 4 shows steps of a location update procedure for a mobile terminal moving within a single logical boundary.

FIG. 4 shows how location update is processed using the mobility management (H.management) protocol while the mobile terminal (MT) 110 moves in a given single logical boundary (e.g., intra-zone in H.323).

Information flows shown in steps 1-10 are self explanatory. Steps 1, 8, 9, and 10 use the application-specific protocol by the MT 110 for communicating with the MAFE 115. However, the information flows used in steps 2-7 use the mobility management (H.management) protocol. These steps 2-7 simply involve the transmission of validation request messages in sequence from a MAFE, for example, a gatekeeper or border element, via a VLF and HLF to Authentication Function (AuF) and return.

Location Updating in Multiple Logical Boundaries

If an MT 110 belongs to its home logical boundary and moves to a visited logical boundary, the communications will be different and slightly more complicated. First, MT 110 needs to register with the visited MAFE. For example, in H.323, an MT moves from its home domain to the visited domain (or from home zone to the visited zone). IMT-2000 and other multimedia applications will also have the similar situations.

Figure 5:
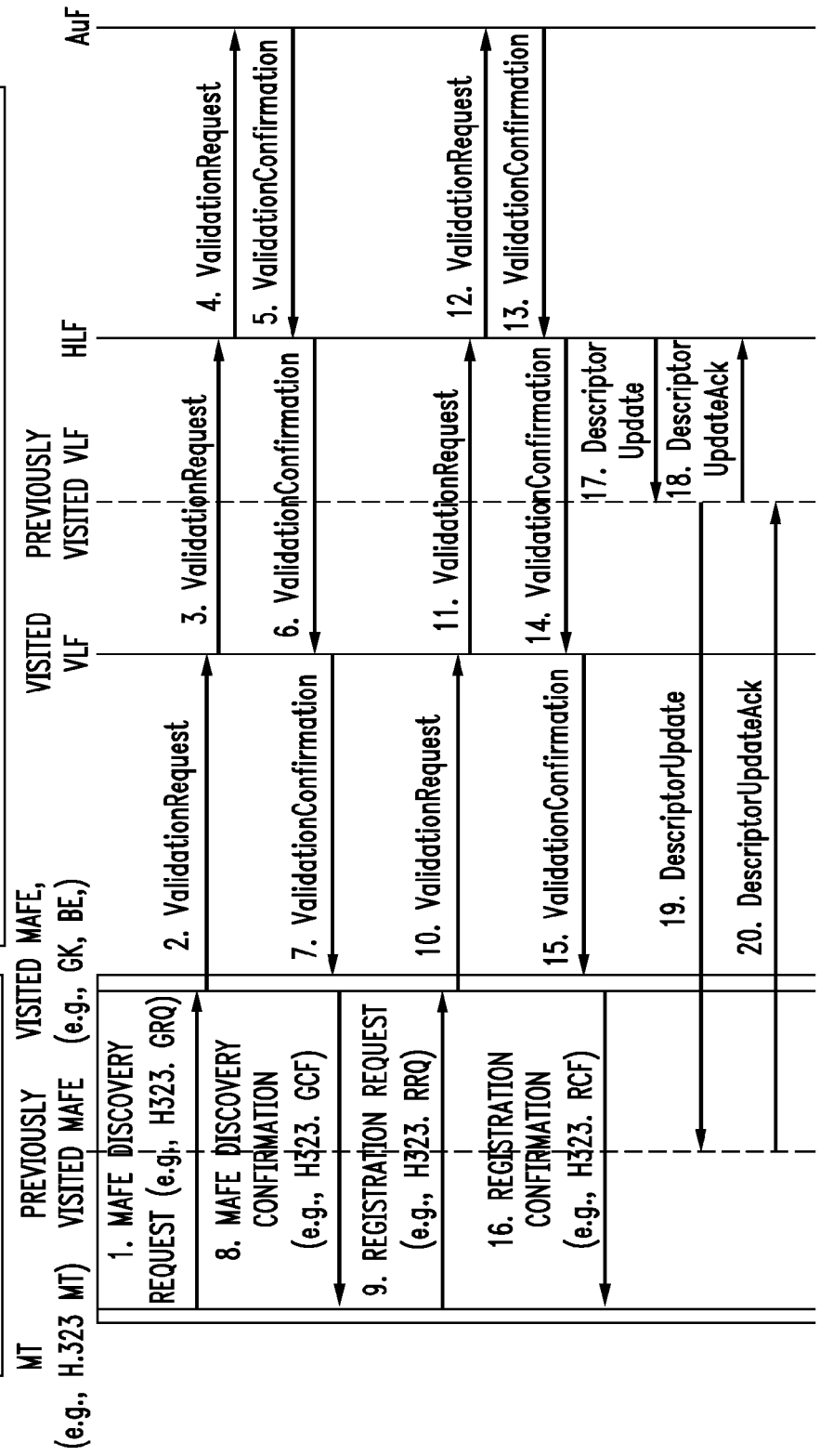
FIG. 5 shows steps of a location update procedure for a mobile terminal undergoing an inter-logical boundary location change.

Information flows in FIG. 5 use two protocols: Application-Specific (Steps 1, 8-9, 16) and the common Mobility Management (H.management) protocol of the present invention [Steps 2-7, 10-15, 17-20]. In this more complicated scenario than FIG. 4, there are two sets of sequential message flows, steps 2-7 and 10-15 for validation request and confirmation. There is also a descriptor update process involving a previously visited VLF, steps 17-20.

Unregistration Initiated by Mobile Terminal

Figure 6:
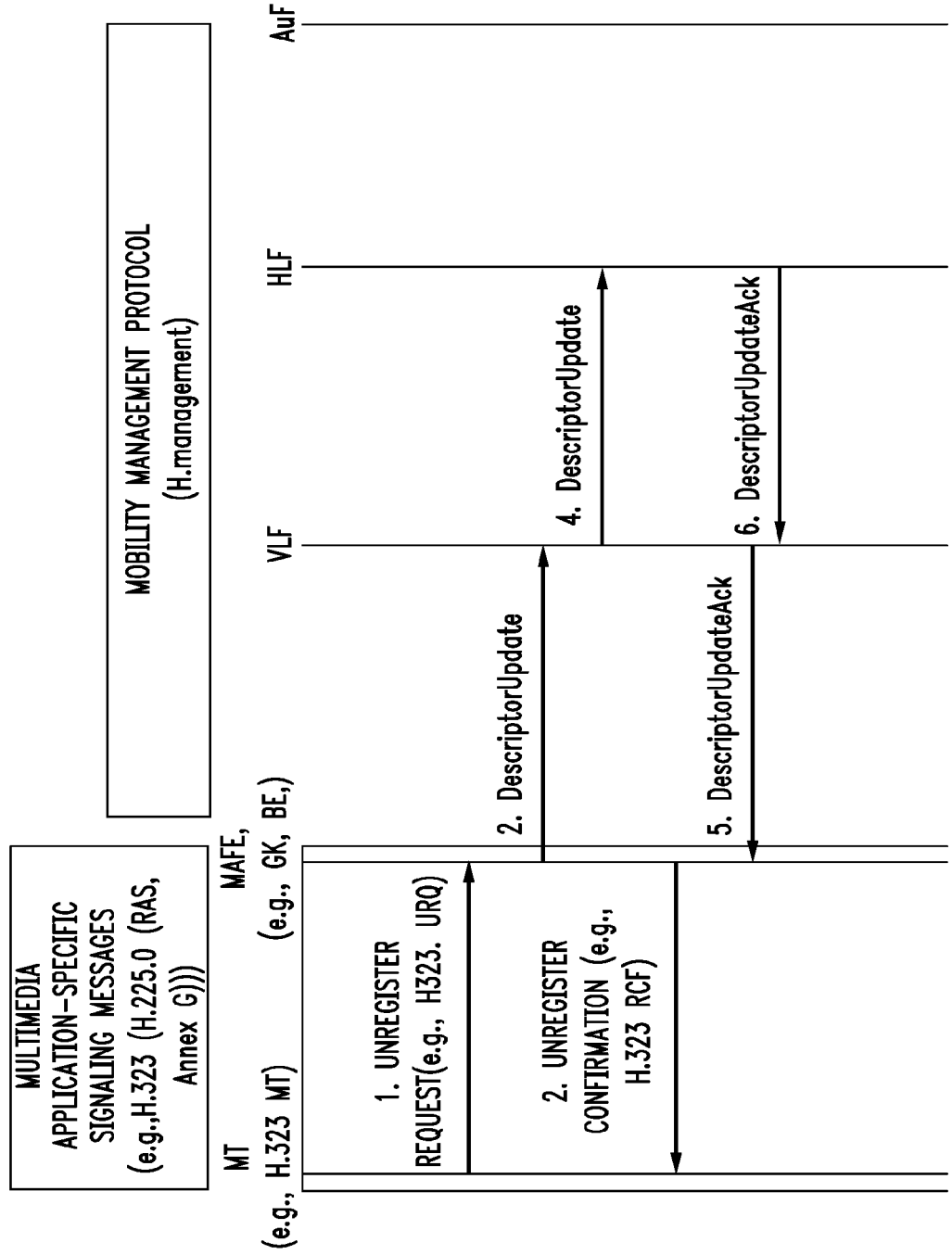
FIG. 6 shows steps of an unregistration initiated by a mobile terminal (MT).

FIG. 6 shows the unregistration initiated by a MT 110.

Steps 1 and 3 use the application-specific protocol while steps 2, 4, and 5-6 use the Mobility Management (H.management) protocol. Steps 2, 4 and 5-6 provide descriptor database access at home location function (HLF) via VLF. An unregister confirmation need not await acknowledgement of a descriptor update. Also, a descriptor update acknowledgement from VLF to MAFE, step 5, need not await acknowledgement from the HLF, step 6.

Unregistration Initiated by the MAFE

Figure 7:
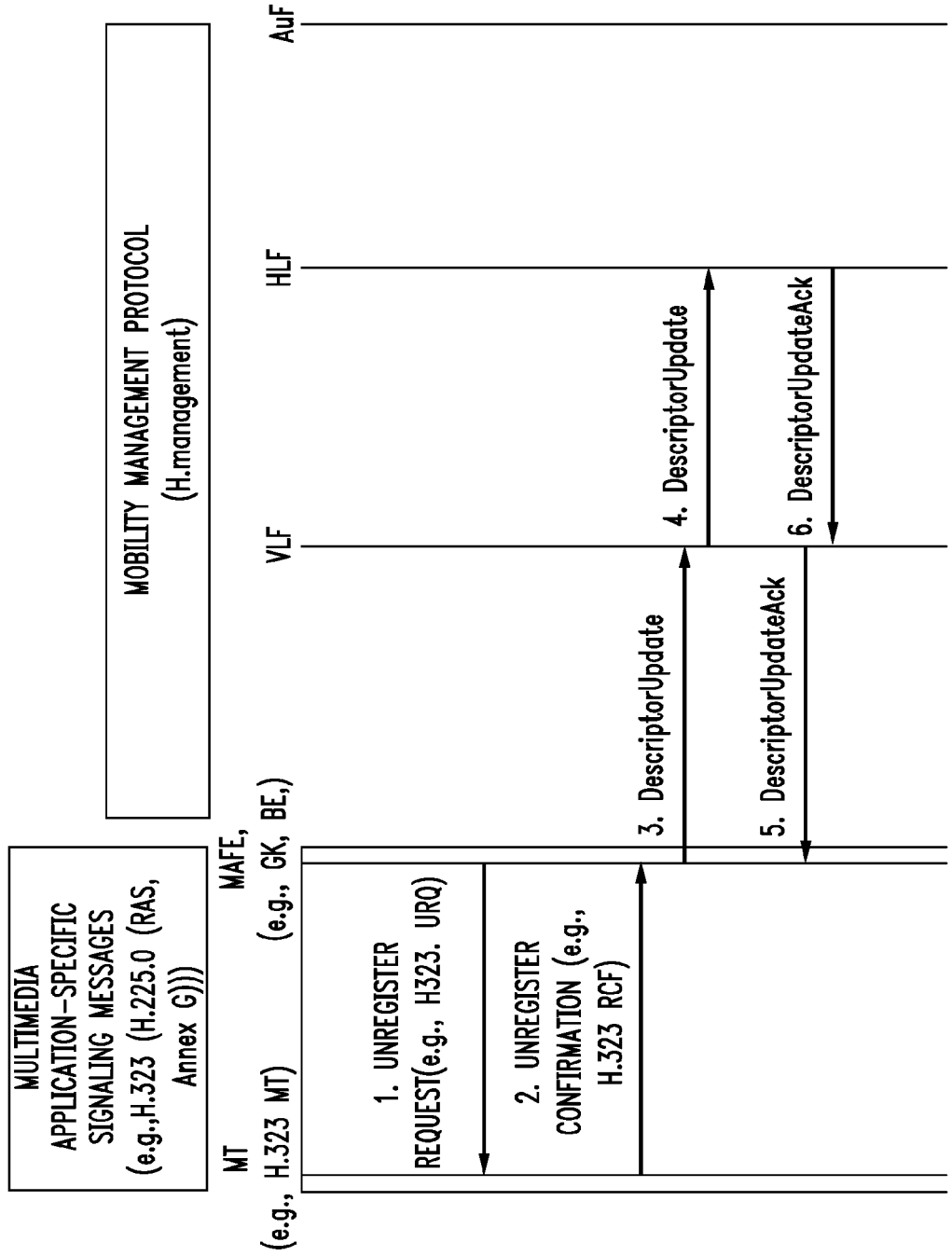
FIG. 7 shows steps of an unregistration initiated by a multimedia application functional entity (MAFE), for example, a gatekeeper or border element in H.323.

FIG. 7 shows the unregistration initiated by the MAFE (e.g., GK in H.323).

Steps 1 and 2 use the application-specific protocol while steps 3-6 use the Mobility Management (H.management) protocol. As in FIG. 6, in FIG. 7, an unregister confirmation need not await acknowledgement of a descriptor update. Also, a descriptor update acknowledgement from VLF to MAFE, step 5, need not await acknowledgement from the HLF, step 6.

Unregistration Initiated by the MMFE (e.g., HLF)

Figure 8:
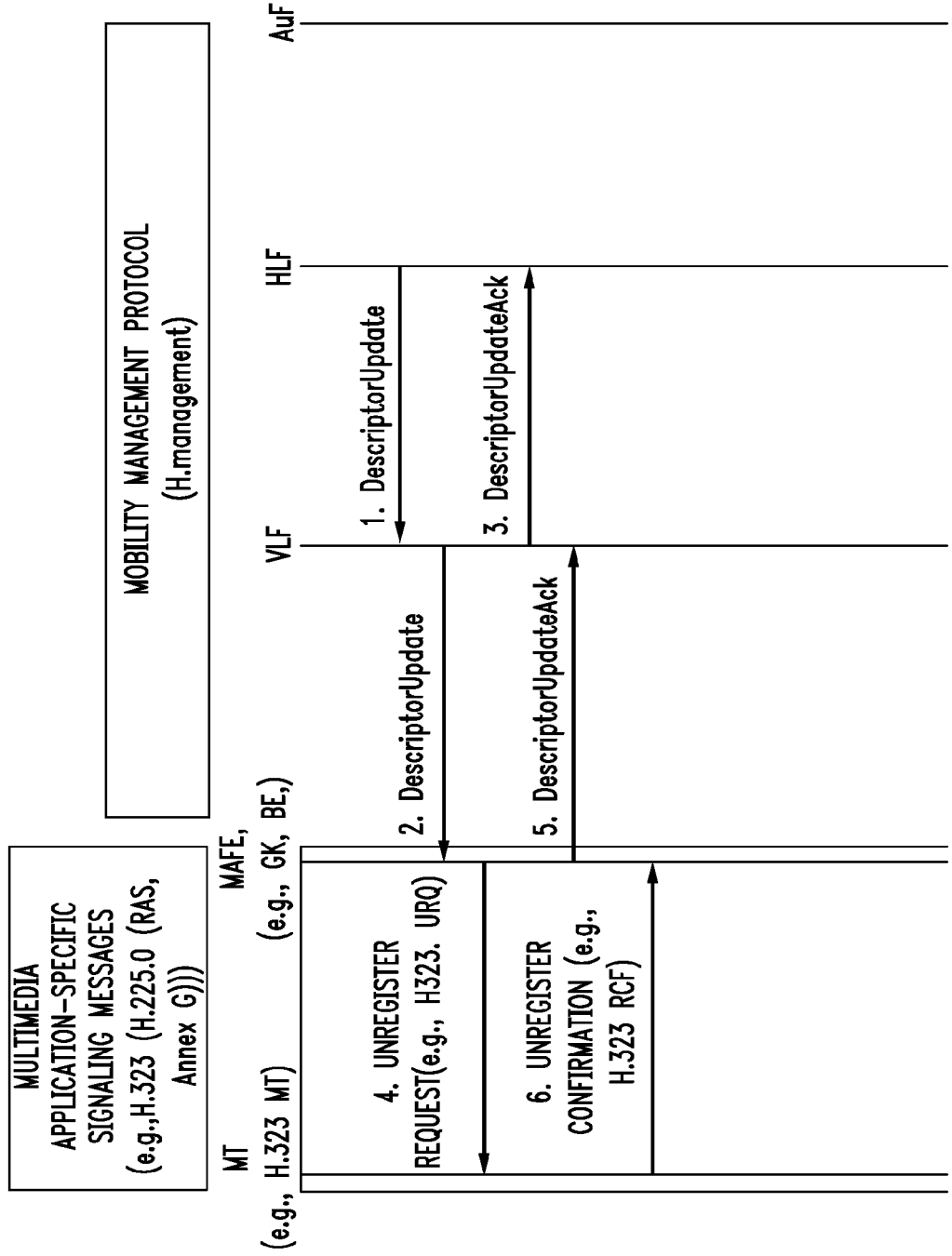
FIG. 8 shows steps of an unregistration initiated by a mobility management functional entity (MMFE), for example, a home location function.
Figure 9:
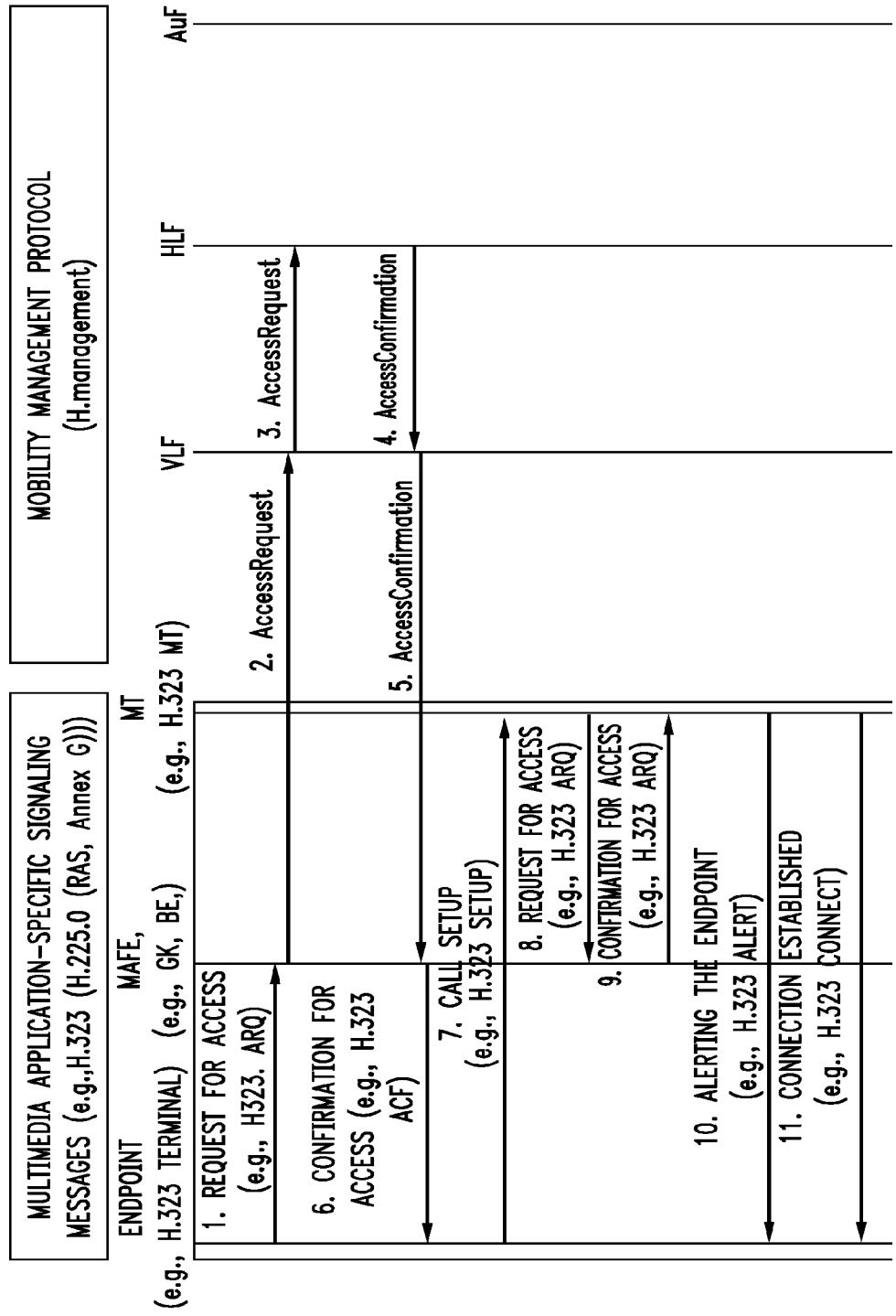
FIG. 9 shows steps of call establishment in an intra-logical boundary terminal move.

FIG. 8 shows the unregistration initiated by the MMFE (e.g., HLF). A HLF can initiate the unregistration based on the policy of the mobility management.

Steps 4 and 6 use the application-specific protocol while steps 1-3 and 5 use the Mobility Management (H.management) protocol. When a VLF receives a descriptor update message, step 1, from an HLF, the VLF may transmit a descriptor update to a MAFE, step 2, and acknowledge the HLF, step 3, before the MAFE acknowledges, step 5, or receives an unregister confirmation from the mobile terminal, step 6.

Call Setup in Intra-Logical Boundary

An MT may move within a single boundary (or intra-logical boundary) while the call is being set up, for example, from a fixed terminal to a mobile terminal (MT) endpoint. In H.323, it can be such that a H.323 mobile user moves within its home zone known as the intra-zone movement.

Steps 1 and 6-11 use the application-specific protocol while steps 2-5 use the Mobility Management (H.management) protocol for access request of the HLF by the MAFE and access confirmation.

Call Setup in Inter-Logical Boundary

Figure 10:
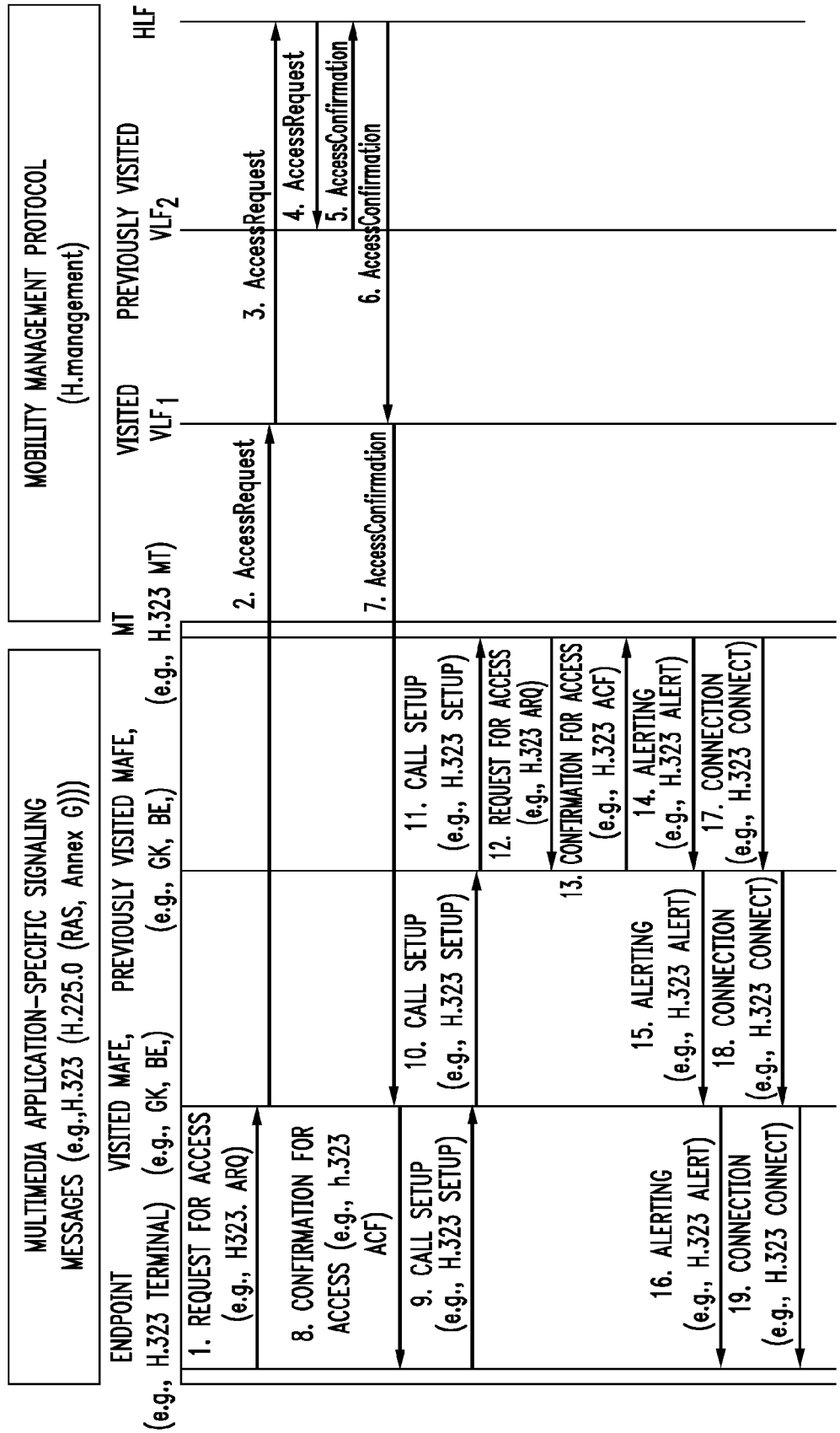
FIG. 10 shows steps of call establishment in an inter-logical boundary terminal move.

FIG. 10 depicts the call establishment when a MT moves from its home logical boundary (e.g., home domain or home zone in H.323) to the visited logical boundary (e.g., visited domain or visited zone in H.323). This situation is also known as the inter-logical boundary (e.g., inter zone, inter-domain in H.323) call establishment.

Steps 1 and 8-19 use the application-specific protocol while steps 2-7 use the Mobility Management (H.management) protocol. The visited MAFE by the mobile terminal endpoint sequentially transmits an access request via the visited VLF to an HLF and once access is confirmed by the HLF, step 7, the visited MAFE confirms the endpoint for access, step 8, and call set up to the mobile terminal endpoint proceeds, steps 9-19.

Message Syntax
Mobility management (H.management) protocol message syntax contains the following:

```
MOBILITY MANAGEMENT MESSAGES DEFINITIONS AUTOMATIC TAGS ::=
BEGIN
IMPORTS
Message ::= SEQUENCE
{
body                        MobilityManagemetMessageBody,
common                      MobilityManagemetCommonInfo
}
MobilityManagemetMessageBody        ::= CHOICE
{
serviceRequest              ServiceRequest,
serviceConfirmation         ServiceConfirmation,
serviceRejection            ServiceRejection,
serviceRelease              ServiceRelease,
serviceProfileRequest       ServiceProfileRequest,
serviceProfileConfirmation  ServiceProfileConfirmation,
serviceProfileRejection     ServiceProfileRejection,
descriptorRequest           DescriptorRequest,
descriptorConfirmation      DescriptorConfirmation,
descriptorRejection         DescriptorRejection,
descriptorIDRequest         DescriptorIDRequest,
descriptor IDConfirmation   Descriptor IDConfirmation,
descriptor IDRejection      Descriptor IDRejection,
descriptorUpdate            DescriptorUpdate,
descriptorUpdateAck         DescriptorUpdateAck,
accessRequest               AccessRequest,
accessRequestConfirmation   AccessRequestConfirmation,
accessRejection             AccessRejection,
validationRequest           ValidationRequest,
validationConfirmation      ValidationConfirmation,
validationRejection         ValidationRejection,
authentication Request      AuthenticationRequest,
authentication Confirmation AuthenticationConfirmation,
authentication Rejection    AuthenticationRejection
}
MobilityManagemetCommonInfo ::= SEQUENCE
{
sequenceNumber              INTEGER (0..65535),
version                     MobilityManagementVersion,
hopCount                    INTEGER (1..255),
nonStandardData             NonStandardParameter,
...
}
TimeZone ::= INTEGER (-43200..43200)        -- number of seconds relative to UTC
                                            -- including DST if appropriate
TerminationCause ::= SEQUENCE
{
releaseCompleteReason       ReleaseCompleteReason,
causeIE                     INTEGER (1..65535) OPTIONAL,
nonStandardData             NonStandardParameter OPTIONAL,
...
}
MobilityManagementVersion ::=       OBJECT IDENTIFIER
                                    -- shall be set to
                                    -- {itu-t (0) recommendation (0) h(8) XXXXXX version (0) 1}
DescriptorID        ::=     GloballyUniqueID
ElementIdentifier::= BMPString (SIZE(1..128))
GlobalTimeStamp ::= IA5String (SIZE(14)) -- in the form YYYYMMDDHHmmSS
                                            -- where YYYY = year, MM = month, DD = day,
                                            -- HH = hour, mm = minute, SS = second
                                            -- (for example, 19981219120000 for noon
                                            -- 19 December 1998)
replyAddress                SEQUENCE OF TransportAddress OPTIONAL, -- Must be
                            present in request
integrityCheckValue         ICV OPTIONAL,
tokens                      SEQUENCE OF ClearToken OPTIONAL,
cryptoTokens                SEQUENCE OF CryptoApplicationSpecificToken OPTIONAL,
nonStandard                 SEQUENCE OF NonStandardParameter OPTIONAL
}
--
-- Mobility Management Messages
--
ServiceRequest ::= SEQUENCE
{
elementIdentifier           ElementIdentifier OPTIONAL,
domainIdentifier            AliasAddress OPTIONAL,
```

```
securityMode              SEQUENCE OF SecurityMode OPTIONAL,
timeToLive                INTEGER (1..4294967295) OPTIONAL,
...
}
SecurityMode ::= SEQUENCE
{
authentication            AuthenticationMechanism OPTIONAL,
integrity                 IntegrityMechanism OPTIONAL,
algorithmOIDs             SEQUENCE OF OBJECT IDENTIFIER OPTIONAL,
...
}
ServiceConfirmation ::= SEQUENCE
{
elementIdentifier         ElementIdentifier,
domainIdentifier          AliasAddress,
alternates                AlternateMobileEntityInfo OPTIONAL,
securityMode              SecurityMode OPTIONAL,
timeToLive                INTEGER (1..4294967295) OPTIONAL,
    ...
}
ServiceRejection ::= SEQUENCE
{
reason                    ServiceRejectionReason,
alternates                AlternateMobileEntityInfo OPTIONAL,
...
}
ServiceRejectionReason ::= CHOICE
{
serviceUnavailable        NULL,
serviceRedirected         NULL,
security                  NULL,
continue                  NULL,
undefined                 NULL,
...
}
ServiceRelease ::= SEQUENCE
{
reason                    ServiceReleaseReason,
alternates                AlternateMobileEntityInfo OPTIONAL,
...
}
ServiceReleaseReason ::= CHOICE
{
outOfService              NULL,
maintenance               NULL,
terminated                NULL,
expired                   NULL,
...
}
ServiceProfileRequest ::= SEQUENCE
{
trafficParameters         TrafficParameters,
basicCall                 BasicCall,
callTransfer              CallTransfer,
callDiversion             CallDiversion,
callHold                  CallHold,
callWaiting               CallWaiting,
callParking               CallParking,
callIntrusion             CallIntrusion,
callingNamePresentation   CallingNamePresentation,
calledNameRestriction     CalledNameRestriction,
selectiveCallAcceptance   SelectiveCallAcceptance,
selectiveCallRejection    SelectiveCallRejection,
messageWaiting            MessageWaiting,
webBasedServices          WebBasedServices,
unifiedMessaging          UnifiedMessaging,
...
}
ServiceProfileConfirmation ::= SEQUENCE
{
...
}
ServiceProfileRejection ::= SEQUENCE
{
...
}
DescriptorRequest ::= SEQUENCE
{
descriptorID              SEQUENCE OF DescriptorID
```

```
}
DescriptorConfirmation ::= SEQUENCE
{
descriptor                    SEQUENCE OF Descriptor
}
DescriptorRejection ::= SEQUENCE
{
reason                        DescriptorRejectionReason,
descriptorID                  DescriptorID OPTIONAL
}
DescriptorRejectionReason ::= CHOICE
{
packetSizeExceeded            NULL, -- use other transport type
illegalID                     NULL,-- no descriptor for provided descriptorID
security                      NULL,-- request did not meet security requirements
hopCountExceeded              NULL,
noServiceRelationship         NULL,
undefined                     NULL
}
DescriptorIDRequest ::= SEQUENCE
{
...
}
DescriptorIDConfirmation ::= SEQUENCE
{
descriptorInfo                SEQUENCE OF DescriptorInfo
}
DescriptorIDRejection ::= SEQUENCE
{
reason                        DescriptorIDRejectionReason
}
DescriptorIDRejectionReason ::= CHOICE
{
noDescriptors                 NULL,-- no descriptors to report
security                      NULL,-- request did not meet security requirements
hopCountExceeded              NULL,
noServiceRelationship         NULL,
undefined                     NULL
}
DescriptorUpdate ::= SEQUENCE
{
sender                        AliasAddress,
updateInfo                    SEQUENCE OF UpdateInformation,
}
UpdateInformation ::=         SEQUENCE
{
        descriptorInfo CHOICE
        {
                descriptorID    DescriptorID,
                descriptor      Descriptor,
        },
        updateType      CHOICE
        {
                added           NULL,
                deleted         NULL,
                changed         NULL
        },
}
DescriptorUpdateAck ::= SEQUENCE
{
        ...
}
AccessRequest ::= SEQUENCE
{
destinationInfo               PartyInformation,
sourceInfo                    PartyInformation OPTIONAL,
callInfo                      CallInformation OPTIONAL,
usageSpec                     UsageSpecification OPTIONAL,    ...
}
AccessConfirmation ::= SEQUENCE
{
templates                     SEQUENCE OF AddressTemplate,
partialResponse               BOOLEAN,
}
AccessRejection ::= SEQUENCE
{
reason                        AccessRejectionReason,
}
AccessRejectionReason ::= CHOICE
```

-continued

```
{
noMatch                         NULL,-- no template matched the destinationInfo
packetSizeExceeded              NULL,-- use other transport type
security                        NULL,-- request did not meet security requirements
hopCountExceeded                NULL,
needCallInformation             NULL, -- Call Information must be specified
noServiceRelationship           NULL,
undefined                       NULL
}
ValidationRequest ::= SEQUENCE
{
accessToken                     SEQUENCE OF AccessToken OPTIONAL,
destinationInfo                 PartyInformation OPTIONAL,
sourceInfo                      PartyInformation OPTIONAL,
callInfo                        CallInformation,
serviceSpecification            ServiceSpecification OPTIONAL,
}
ValidationConfirmation ::= SEQUENCE
{
destinationInfo                 PartyInformation OPTIONAL,
serviceSpecification            ServiceSpecification OPTIONAL,
}
ValidationRejection ::= SEQUENCE
{
reason                          ValidationRejectionReason,
}
ValidationRejectionReason ::= CHOICE
{
tokenNotValid                   NULL,
security                        NULL,-- request did not meet security requirements
hopCountExceeded                NULL,
missingSorceInfo                NULL,
missingDestInfo                 NULL,
noServiceRelationship           NULL,
undefined                       NULL
}
AuthenticationRequest ::= SEQUENCE
{
sourceInfo                      PartyInformation,
tunneledMessage                 ApplicationSpecificMessage — for example tunneled RAS
                                messages in H.323
}
AuthenticationConfirmation ::= SEQUENCE
{
encryptionToken                 SEQUENCE OF EncryptionToken OPTIONAL,
destinationInfo                 PartyInformation OPTIONAL
}
AuthenticationRejection ::= SEQUENCE
{
reason                          AuthenticationRejectionReason,
tunneledMessage                 ApplicationSpecificMessage OPTIONAL,
destinationInfo                 PartyInformation OPTIONAL,
}
EncryptionToken ::= CHOICE
{
token                           ClearToken,
cryptoToken                     CryptoApplicationSpecificToken
}
AuthenticationRejectionReason ::= CHOICE
{
security                        NULL,
hopCountExceeded                NULL,
missingSourceInfo               NULL,
noServiceRelationship           NULL,
undefined                       NULL
}
---
--- Structures of Common Messages
---
AddressTemplate ::= SEQUENCE
{
pattern                         SEQUENCE OF Pattern,
routeInfo                       SEQUENCE OF RouteInformation,
timeToLive                      INTEGER (1..4294967295),
}
Pattern ::= CHOICE
{
specific            AliasAddress,
wildcard            AliasAddress,
```

```
                range SEQUENCE
                {
                        startOfRange      PartyNumber,
                        endOfRange        PartyNumber
                },
        }
}
RouteInformation ::= SEQUENCE
{
        messageType CHOICE
        {
                sendAccessRequest         NULL,
                sendSetup                 NULL, -- specific for each application
                nonExistent               NULL,
                ...
        },
        callSpecific              BOOLEAN,
        serviceSpecification      ServiceSpecification OPTIONAL,
        contacts                  SEQUENCE OF ContactInformation,
        type                      EndpointType OPTIONAL,
                                  -- must be present if messageType = sendSetup
        ...
}
ContactInformation ::= SEQUENCE
{
transportAddress          AliasAddress,
priority                  INTEGER (0..127),
transportQoS              TransportQOS OPTIONAL,
security                  SEQUENCE OF SecurityMode OPTIONAL,
accessTokens              SEQUENCE OF AccessToken OPTIONAL,
        ...
}
Descriptor ::= SEQUENCE
{
descriptorInfo            DescriptorInfo,
templates                 SEQUENCE OF AddressTemplate,
applicationEntityID       ApplicationEntityID OPTIONAL,
...
}
DescriptorInfo ::= SEQUENCE
{
descriptorID              DescriptorID,
lastChanged               GlobalTimeStamp,
...
}
AlternateMobileEntityInfo ::= SEQUENCE
{
alternateMobileEntity     SEQUENCE OF AlternateMobileEntity,
alternateIsPermanent      BOOLEAN,
...
}
AlternateMobileEntity ::= SEQUENCE
{
contactAddress            AliasAddress,
priority                  INTEGER (1..127),
elementIdentifier         ElementIdentifier OPTIONAL,
        ...
}
AccessToken ::= CHOICE
{
token                     ClearToken,
cryptoToken               CryptoApplicationSpecificToken,
...
}
CallInformation ::= SEQUENCE
{
callIdentifier            CallIdentifier,
conferenceID              ConferenceIdentifier,
...
}
ServiceCallStatus ::= CHOICE
{
preConnect                NULL,-- Call has not started
callInProgress            NULL,-- Call is in progress
callEnded                 NULL,-- Call ended
        ...
}
UserInformation ::= SEQUENCE
{
userIdentifier            AliasAddress,
```

-continued

```
userAuthenticator          SEQUENCE OF CryptoApplicationSpecificToken OPTIONAL,
...
}
PartyInformation ::= SEQUENCE
{
      logicalAddresses    SEQUENCE OF AliasAddress,
      domainIdentifier    AliasAddress OPTIONAL,
      transportAddress    AliasAddress OPTIONAL,
      endpointType        EndpointType OPTIONAL,
      userinfo            UserInformation OPTIONAL,
      timeZone            TimeZone OPTIONAL,
      ...
}
Role ::= CHOICE
{
originator                 NULL,
destination                NULL,
```

The following message elements may be similarly defined:
AuthenticationMechanism, TimeStamp, ClearToken
FROM H235-SECURITY-MESSAGES

```
      AliasAddress, TransportAddress, ReleaseCompleteReason,
      ConferenceIdentifier, CallIdentifier, CryptoMobileEntityToken,
      CryptoToken,       EndpointType, GatekeeperIdentifier,
      GloballyUniqueID, NonStandardParameter, NumberDigits,
      PartyNumber, TransportQOS, VendorIdentifier,
          IntegrityMechanism,
          ICV
}
END --   of MOBILITY MANAGEMENT MESSAGES
```

Relationship between Common Mobility Management Protocol and H.MMS1/2/3

The mobility management (H.management) protocol will be used as the common base protocol for mobility management by all applications.

H.MMS.1 will use the mobility management (H.management) protocol in the H.323 application-specific environment. That is, a MAFE protocol part as described above will be H.323 while the mobility management part of H.MMS.1 will be H.management.

H.MMS.2 will use the mobility management (H.management) protocol in the IMT-2000 application-specific environment. That is, a MAFE protocol part as described above will be IMT-2000 while the mobility management part of H.MMS.2 will be H.management.

H.MMS.3 will use the mobility management (H.management) protocol in the Presence/Instant Messaging application-specific environment. That is, a MAFE protocol part as described above will be Presence/Instant Messaging while the mobility management part of H.MMS.3 will be H.management.

Scope of Q.5/16

| Description | Recommendation | Remarks |
|---|---|---|
| Common Mobility Management Protocol | H. management: A new recommendation in Q.5/16 that will be used by all multimedia applications for mobility management that includes HLF, VLF, and AuF | A new work item for Q.5/16 (This common standard will be used by H.MMS.1, H.MMS.2, and H.MMS.3) |
| H.323 Mobility | H.MMS.X: A new recommendation that extends the base H.323 (H.225.0 RAS, Annex G) protocol messages to support mobility | Extension of H.225.0 (RAS and Annex G) messages to support mobility only |
| | H.MMS.1 (H.MMS.1 + H. management): It will incorporate both H.MMS.X and H. management to enhance H.323 for supporting mobility | Extended H.225.0 (RAS and Annex G) to support mobility + H. management for HLF, VLF, and AuF mobility management |
| Global Mobility Management | H.MMS.2 (IMT-2000 + H. management) | IMT-2000 will be using the H. management protocol |
| Extension of H.323 for supporting Presence in mobile environment | H.MMS.Y: A new recommendation to extend the base H.323 (H.225.0 [RAS + Annex G]) protocol to support Presence | Enhancement of H.323 (H.225.0 [RAS + Annex G]) to have the capabilities of Presence application |
| | H.MMS.3: H.MMS.Y + H.MMS.1 [H.MMS.1 + H. management] | Enhancement to include the mobility management (HLF, VLF, AuF) in the augmented H.323 with Presence capabilities |
| Extension of H.323 for supporting Instant Messaging in mobile environment | H.IM.1: Extend the base H.323 (H.225.0 RAS, Annex G) protocol messages to support Instant Messaging | Enhancement of H.323 (H.225.0 [RAS + Annex G]) to have the capabilities of Instant Messaging application |
| | H.IM.W: H.IM.1 + H. management | Enhancement to include the mobility management (HLF, VLF, AuF) in the augmented H.323 with Instant Messaging capabilities |

CONCLUSION

A common mobility management protocol for Q.5/16 (Mobility for Multimedia Systems/Applications and Services) has been proposed. All applications that need to support mobility management among their home location function (HLF) and visitor location function (VLF) databases/servers can use this protocol. The reference architecture, functional characteristics, features, and capabilities of the protocol along with call flows and message syntax have been described.

In this context, the scope of Q.5/16 and how H.MMS.1 (H.323 Mobility), H.MMS.2 (Global Mobility), and H.MMS.3 (Presence/Instant Messaging Mobility) can be a part of the same common mobility management protocol have also been presented.

I claim:

1. A method comprising:
    generating, via a computer processor, a descriptor request message specifying a descriptor, the descriptor carrying address information and comprising a template, a functional entity identifier indicating an associated functional entity of the descriptor, and a unique identifier comprising a time the descriptor last changed;
    transmitting the descriptor request message to a descriptor owning functional entity;
    receiving a descriptor confirmation from the descriptor owning functional entity, the descriptor confirmation identifying address templates conforming to the descriptor request message; and
    communicating with a mobility application functional entity at an address identified by the descriptor confirmation, wherein the transmitting, receiving, and communicating occurs between management application functional entities and mobility management entities, and between mobility management functional entities.

2. The method of claim 1, wherein the template further comprises a template life field.

3. The method of claim 2, further comprising:
    caching a copy of the template for a period of time specified by the template life field.

4. The method of claim 3, further comprising:
    generating a new descriptor request message at an expiration of the period of time.

5. The method of claim 1, further comprising:
    receiving a descriptor update and one of deleting, adding, and modifying templates identified by the descriptor update.

6. The method of claim 1 further comprising:
    messaging between a multimedia application functional entity and a mobility management functional entity, the mobility management functional entity comprising one of an authentication function, a home location function, and a visitor location function for mobility management, and messaging between two mobility management functional entities.

7. A system comprising:
    a computer processor; and
    a computer-readable storage medium having instructions stored which, when executed by the computer processor, cause the computer processor to perform operations comprising:
        generating a descriptor request message specifying a descriptor, the descriptor carrying address information and comprising a template, a functional entity identifier indicating an associated functional entity of the descriptor, and a unique identifier comprising a time the descriptor last changed;
        transmitting the descriptor request message to a descriptor owning functional entity;
        receiving a descriptor confirmation from the descriptor owning functional entity, the descriptor confirmation identifying address templates conforming to the descriptor request message; and
        communicating with a mobility application functional entity at an address identified by the descriptor confirmation, wherein the transmitting, receiving, and communicating occurs between management application functional entities and mobility management entities, and between mobility management functional entities.

8. The system of claim 7, wherein the template further comprises a template life field.

9. The system of claim 8, the computer-readable storage medium having additional instructions stored which result in the operations further comprising:
    caching a copy of the template for a period of time specified by the template life field.

10. The system of claim 9, the computer-readable storage medium having additional instructions stored which result in the operations further comprising:
    generating a new descriptor request message at an expiration of the period of time.

11. The system of claim 7, the computer-readable storage medium having additional instructions stored which result in the operations further comprising:
    receiving a descriptor update and one of deleting, adding, and modifying templates identified by the descriptor update.

12. The system of claim 7, the computer-readable storage medium having additional instructions stored which result in the operations further comprising:
    messaging between a multimedia application functional entity and a mobility management functional entity, the mobility management functional entity comprising one of an authentication function, a home location function, and a visitor location function for mobility management, and messaging between two mobility management functional entities.

13. A non-transitory computer-readable storage device having instructions stored which, when executed by a computing device, cause the computing device to perform operations comprising:
    generating a descriptor request message specifying a descriptor, the descriptor carrying address information and comprising a template, a functional entity identifier indicating an associated functional entity of the descriptor, and a unique identifier comprising a time the descriptor last changed;
    transmitting the descriptor request message to a descriptor owning functional entity;
    receiving a descriptor confirmation from the descriptor owning functional entity, the descriptor confirmation identifying address templates conforming to the descriptor request message; and
    communicating with a mobility application functional entity at an address identified by the descriptor confirmation, wherein the transmitting, receiving, and communicating occurs between management application functional entities and mobility management entities, and between mobility management functional entities.

14. The non-transitory computer-readable storage device of claim 13, wherein the template further comprises a template life field.

15. The non-transitory computer-readable storage device of claim 14, the computer-readable storage device having additional instructions stored which result in the operations further comprising:
    caching a copy of the template for a period of time specified by the template life field.

16. The non-transitory computer-readable storage device of claim 15, the computer-readable storage device having additional instructions stored which result in the operations further comprising:
    generating a new descriptor request message at an expiration of the period of time.

17. The non-transitory computer-readable storage device of claim 13, the computer-readable storage device having additional instructions stored which result in the operations further comprising:

receiving a descriptor update and one of deleting, adding, and modifying templates identified by the descriptor update.

18. The non-transitory computer-readable storage device of claim 13, the computer-readable storage device having additional instructions stored which result in the operations further comprising:

messaging between a multimedia application functional entity and a mobility management functional entity, the mobility management functional entity comprising one of an authentication function, a home location function, and a visitor location function for mobility management, and messaging between two mobility management functional entities.

* * * * *